(12) United States Patent
Wu

(10) Patent No.: US 9,727,910 B1
(45) Date of Patent: Aug. 8, 2017

(54) METHODS, SYSTEMS, AND ARTICLES OF MANUFACTURE FOR IMPLEMENTING AN ANTECEDENT, LOCATION-BASED BUDGET ALERT TO A USER

(75) Inventor: Eddy W. Wu, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 68 days.

(21) Appl. No.: 13/097,946

(22) Filed: Apr. 29, 2011

(51) Int. Cl.
*G06Q 40/00* (2012.01)
*G06Q 40/02* (2012.01)

(52) U.S. Cl.
CPC .................................... *G06Q 40/02* (2013.01)

(58) Field of Classification Search
CPC ....................................................... G06Q 40/02
USPC ............................................................ 705/35
See application file for complete search history.

(56) References Cited

U.S. PATENT DOCUMENTS

| | | | |
|---|---|---|---|
| 5,914,472 | A | 6/1999 | Foladare et al. |
| 6,038,552 | A | 3/2000 | Fleischl et al. |
| 6,583,794 | B1 | 6/2003 | Wattenberg |
| 7,249,092 | B2 | 7/2007 | Dunn et al. |
| 7,366,684 | B1 | 4/2008 | Douglas |
| 7,848,765 | B2 * | 12/2010 | Phillips et al. ............ 455/456.3 |
| 7,970,669 | B1 | 6/2011 | Santos |
| 8,538,827 | B1 | 9/2013 | Dryer et al. |
| 2002/0194079 | A1 | 12/2002 | Kimble |
| 2003/0074209 | A1 | 4/2003 | Tobin |
| 2003/0126100 | A1 * | 7/2003 | Chithambaram ................. 706/8 |
| 2003/0197058 | A1 | 10/2003 | Benkert et al. |
| 2004/0031856 | A1 | 2/2004 | Atsmon et al. |
| 2004/0039694 | A1 | 2/2004 | Dunn et al. |
| 2004/0254835 | A1 | 12/2004 | Thomas et al. |
| 2006/0059085 | A1 | 3/2006 | Tucker |
| 2006/0276180 | A1 | 12/2006 | Henry, Jr. |
| 2007/0078760 | A1 | 4/2007 | Conaty et al. |
| 2007/0106558 | A1 | 5/2007 | Mitchell et al. |
| 2007/0149252 | A1 | 6/2007 | Jobs et al. |
| 2008/0237336 | A1 | 10/2008 | Bates et al. |
| 2008/0249984 | A1 | 10/2008 | Coimbatore et al. |
| 2009/0037461 | A1 | 2/2009 | Rukonic et al. |

(Continued)

OTHER PUBLICATIONS

Non-Final Office Action dated Dec. 1, 2011 in U.S. Appl. No. 12/545,525, filed Aug. 21, 2009, (12 pages).

(Continued)

*Primary Examiner* — Eric T Wong
(74) *Attorney, Agent, or Firm* — Vista IP Law Group LLP

(57) ABSTRACT

Location-based notification to a user before the user engages in a transaction at a location. Embodiments determine a location of a store at which the user is in or near by using positioning data received at a mobile communication device and determines a potential transaction amount for the user at the store and generates budget data based at least in part on a budget goal identified from a local memory of the mobile communication device or received from a remotely hosted financial management system. Budget data is presented to the user, e.g., in the form of a message, notification, or warning on the mobile communication device to inform the user about budget items relevant to a merchant at that location. The user may choose to initiate or complete a transaction at the location with or without involving the financial management system.

32 Claims, 14 Drawing Sheets

(56) References Cited

U.S. PATENT DOCUMENTS

| | | |
|---|---|---|
| 2009/0076896 A1* | 3/2009 | DeWitt et al. .................. 705/14 |
| 2009/0240605 A1* | 9/2009 | Rukonic et al. ................ 705/30 |
| 2009/0286553 A1 | 11/2009 | Northway et al. |
| 2009/0327151 A1 | 12/2009 | Carlson et al. |
| 2010/0104078 A1 | 4/2010 | Henry et al. |
| 2010/0198626 A1 | 8/2010 | Cho et al. |
| 2010/0268629 A1 | 10/2010 | Ross |
| 2010/0312684 A1 | 12/2010 | Kemper et al. |
| 2011/0231321 A1 | 9/2011 | Milne |
| 2011/0238474 A1 | 9/2011 | Carr et al. |
| 2011/0238476 A1* | 9/2011 | Carr ...................... G06Q 30/00 705/14.25 |
| 2012/0010929 A1 | 1/2012 | Kolli et al. |
| 2012/0023011 A1 | 1/2012 | Hurwitz et al. |
| 2012/0083285 A1* | 4/2012 | Shatsky et al. ............ 455/456.1 |
| 2012/0197773 A1* | 8/2012 | Grigg et al. ..................... 705/35 |
| 2012/0239288 A1 | 9/2012 | Forutanpour et al. |
| 2012/0245989 A1* | 9/2012 | Kakarla et al. ............ 705/14.25 |
| 2013/0066750 A1 | 3/2013 | Siddique et al. |
| 2013/0138656 A1 | 5/2013 | Wheaton |

OTHER PUBLICATIONS

Amendment dated Feb. 23, 2012 in U.S. Appl. No. 12/545,525, filed Aug. 21, 2009, (27 pages).
Interview Summary dated Feb. 27, 2012 in U.S. Appl. No. 12/545,525, filed Aug. 21, 2009, (3 pages).
Non-Final Office Action dated Feb. 3, 2012 in U.S. Appl. No. 12/710,977, filed Feb. 23, 2010, (33 pages).
Non-Final Office Action dated Oct. 13, 2011 in U.S. Appl. No. 12/771,990, filed Apr. 30, 2010, (11 pages).
Interview Summary dated Jan. 26, 2012 in U.S. Appl. No. 12/771,990, filed Apr. 30, 2010, (3 pages).
Amendment dated Feb. 6, 2012 in U.S. Appl. No. 12/771,990, filed Apr. 30, 2010, (10 pages).
Office Action dated Dec. 1, 2011, Amendment dated Feb. 23, 2012, Final Office Action dated Oct. 15, 2012 and Amendment dated Feb. 15, 2013 in U.S. Appl. No. 12/545,525, filed Aug. 21, 2009, (73 pages).
Final Office Action dated Nov. 26, 2012 in U.S. Appl. No. 12/710,977, filed Feb. 23, 2010, (17 pages).
Office Action dated Oct. 17, 2012 and Amendment dated Feb. 19, 2013 in U.S. Appl. No. 13/098,137, filed Apr. 29, 2011, (40 pages).
Interview Summary dated Oct. 15, 2012 in U.S. Appl. No. 12/545,525, filed Aug. 21, 2009, (2 pages).
Final Office Action dated Oct. 15, 2012 in U.S. Appl. No. 12/545,525, filed Aug. 21, 2009, (16 pages).
Amendment filed Feb. 15, 2013 in U.S. Appl. No. 12/545,525, filed Aug. 21, 2009, (17 pages).
Interview Summary dated Oct. 10, 2013 in U.S. Appl. No. 12/545,525, filed Aug. 21, 2009, (2 pages).
Office Action dated Oct. 11, 2013 in U.S. Appl. No. 12/545,525, filed Aug. 21, 2009, (15 pages).
Amendment filed Apr. 11, 2014 in U.S. Appl. No. 12/545,525, filed Aug. 21, 2009, (24 pages).
Office Action dated Oct. 17, 2012 in U.S. Appl. No. 13/098,137, filed Apr. 29, 2011, (25 pages).
Amendment filed Feb. 19, 2013 in U.S. Appl. No. 13/098,137, filed Apr. 29, 2011, (15 pages).
Notice of Allowance dated May 7, 2013 in U.S. Appl. No. 13/098,137, filed Apr. 29, 2011, (11 pages).
Office Action dated May 20, 2013 in U.S. Appl. No. 13/251,177, filed Sep. 30, 2011, (17 pages).
Amendment filed Oct. 21, 2013 in U.S. Appl. No. 13/251,177, filed Sep. 30, 2011, (11 pages).
Final Office Action dated Mar. 16, 2014 in U.S. Appl. No. 13/251,177, filed Sep. 30, 2011, (18 pages).
Office Action dated Mar. 12, 2014 in U.S. Appl. No. 13/361,130, filed Jan. 20, 2012, (14 pages).
Amendment filed Jun. 12, 2014 in U.S. Appl. No. 13/361,130, filed Jan. 20, 2012, (13 pages).
Amendment filed Sep. 29, 2014 in U.S. Appl. No. 12/545,525, filed Aug. 21, 2009, (12 pages).
Final Office Action dated Nov. 10, 2014 in U.S. Appl. No. 12/545,525, filed Aug. 21, 2009, (14 pages).
Amendment filed Jan. 12, 2015 in U.S. Appl. No. 12/545,525, filed Aug. 21, 2009, (29 pages).
Office Action dated Oct. 21, 2014 in U.S. Appl. No. 12/571,289, filed Sep. 30, 2009, (19 pages).

* cited by examiner

METHODS, SYSTEMS, AND ARTICLES OF MANUFACTURE FOR IMPLEMENTING AN ANTECEDENT, LOCATION-BASED BUDGET ALERT TO A USER

BACKGROUND

Many consumers use online or offline financial services or applications such as Intuit Quicken® or Mint® or Microsoft Money® to set category-based budget goals to manage their personal finances. For example, a consumer may wish to spend no more than $50 dollars on coffee every month. These finance services or applications provide the users with posterior review of their respective budget process because these finance services or applications track the budget progress by relying on the user's manual data entry of the transaction data or by pulling electronic transaction records from financial institutions (e.g., credit card companies or banks) after the transactions are completed. In other words, the users only know how their respective budget goals progress after the users have already spent the money. Behavioral economics suggest that humans are not very good at deferring immediate gratification for a long term reward, and thus the after-the-fact budget goal review and tracking provide little help with the users to keep their respective budgets.

SUMMARY

Disclosed are various embodiments relating to methods, systems, and articles of manufacture for implementing an antecedent reminder of a budget goal of a user.

In one or more embodiments, a method or system for fulfilling a loan request of a business entity includes the process or module for identifying a store based at least in part upon positioning data received at the mobile device. The method or the system may further identify a store based at least in part upon some positioning data that are received at a mobile device utilized by the user in some embodiments. In some embodiments, the method or the system may comprise the process(es) or module(s) for identifying a budget goal of the user for the store by using at least the positioning data.

In some embodiments, the method or the system may comprise the process or module for generating or receiving budgeting data based at least in part upon the budget goal. In some embodiments, the method or the system may further present at least some of the budgeting data to the user on the mobile device. In some embodiments, the budget goal is identified from a physical memory of the mobile device. In some other embodiments, the budget goal may be identified from a financial management system that is hosted on a remote computing node. The financial management system may comprise one or more finance management tools such as Intuit Quicken® or Microsoft Money® or one or more online financial management services such as Intuit Mint.com. In some embodiments, various processes or modules are performed or executed before the initialization or completion of a transaction at a store by the user. The process or module for identifying the store may comprise the process or module for identifying or receiving the positioning data, the process or module for identifying one or more data structures including various positioning data and corresponding stores, the process or module for determining or identifying one or more possible stores by using the one or more data structures, and the process or module for determining or selecting the store from the one or more candidate stores in some embodiments. In some embodiments, the process or module for identifying the store may further comprise the process or module for determining whether the positioning data corresponds to multiple stores, the process or module for identifying the multiple stores as the one or more candidate stores, the process or module for determining whether the store correspond to multiple transactions by using at least the one or more data structures which include stores and their respective transactions, and the process or module for determining a potential transaction by using at least the one or more data structures. In some embodiments, the process or module for generating or receiving budget data associated with a budget goal may further comprise the process or module for determining whether the store corresponds to multiple spending categories by using at least the one or more data structures, wherein the one or more data structures comprise data or information of stores or transaction and their respective categories, the process or module for identifying or determining one or more candidate categories for the store by using the one or more data structures, the process or module for determining a potential category for the store, and the process or module for identifying or determining a potential transaction amount for the store. In some embodiments, the method or the system may further comprise the process or module for identifying historical spending data of one or more prior time periods of the user and the process or module for using the historical spending data to determine at least one of the one or more candidate stores, the store, the multiple transactions, the potential transaction, and the budget data. In some embodiments, the method or the system may further comprise the process or module for identifying current spending data of the user, the process or module for calibrating the historical spending data by using at least the current spending data. In some embodiments, the budget data may comprise at least one of an amount of the budget goal remaining for a current budgeting period or an amount the user is over the budget goal for the current budgeting period, an amount of the budget goal remaining for the current budget period or an amount the user would be over the budget goal for the current budget period if the user completed a transaction at the merchant store, remaining time till an end of the current budgeting period, an indication that the user is currently under or over the budget goal for a current budget period, an amount of time remaining until an end of the current budgeting period, a message to the user, a message to a super user, a custodian, or a primary account holder, an account balance of the user before and after a potential transaction at the store, and a lock-up notification to the user. In some embodiments, the method or the system may further comprise the process or module for initiating or completing one or more transactions at the store, the process or module for updating a record on the mobile communication device reflecting an amount of the one or more transactions, and the process or module for synchronizing data or information between the mobile communication device and the computer to update the budget data based at least in part upon a transaction amount for the one or more transactions. In some embodiments, the method or the system may further comprise the process or module for updating budget data stored on the computer. In one or more embodiments, the transaction at the store may be initiated or completed by using the mobile communication device. In some embodiments where the store may offer multiple types of transactions that fall within multiple categories, the method or the system may further comprise the process or module for identifying a respective budget goal for each of the multiple categories, the process or module for allocating the potential transaction amount among the multiple categories, and the process or module for generating or receiving the budget data for each of the multiple categories using the respective budget goal. In some embodiments, the store may be identified by performing at least one process or executing at least one module for identifying the store using at least one or more signals of a global positioning system, the process or module for identifying the store using at least one or more signals from a hybrid positioning system, the process or module for identifying the store using at least a Wi-Fi positioning system, the process or module for identifying the store using at least an electronic altimeter, the process or module for identifying the store using at least an electronic compass, in which an output of the electronic compass is used to determine the store, the process or module for identifying the store using at least a user's input for the store, the process or module for identifying the store using at least historical data including a pattern that the user has visited one or more stores, and the process or module for identifying the store using at least a mobile communication device tracking technique. In some embodiments where the store corresponds to multiple categories, the method or the system may further comprise at least one of the process or module for allocating the potential transaction amount to a first category of the multiple categories in its entirety, the process or module for allocating the potential transaction amount to a second category with most remaining budget, the process or module for allocating the potential transaction amount to a third category with a slowest spending pace, the process or module for allocating the potential transaction amount to two or more categories of the multiple categories based at least in part upon historical data, in which the historical data comprise one or more amounts that the user has spent in each of the two or more categories, and the process or module for dividing the potential transaction amount among the two or more categories based at least in part upon a respective weight for each of the two or more categories. In some embodiments, the method or the system may determine the potential transaction using one or more data structures by performing at least one of the process or module for determining the potential transaction from the multiple transactions from a user's input for the potential transaction, in which the user's input overrides a result of using at least the one or more data structures, the process or module for determining the potential transaction from the multiple transactions using historical data, in which the historical data comprise data or information about prior transaction history of the user at the store, and the process or module for preventing the user from conducting the potential transaction at the store by locking up one or more payment means of the user.

Some embodiments are directed at an apparatus for implementing various processes described herein. More details about the apparatus for implementing various processes will be described in some of the subsequent paragraphs with reference to one or more drawing figures. Some embodiments are directed at an article of manufacture having stored thereupon a sequence of instructions which, when executed by a mobile communication device, causes the mobile communication device to perform various processes or to invoke various modules described herein. More details about the article of manufacture will be described in some of the subsequent paragraphs with reference to one or more drawing figures.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the invention will be described, and the detailed descriptions of other portions of such known components (or methods or processes) will be omitted for ease of explanation and to not obscure embodiments.

DETAILED DESCRIPTION OF ILLUSTRATED EMBODIMENTS

Embodiments are directed to generating and displaying a message, notice or warning on a user's mobile communication device based at least in part upon a user's location to inform the user about a budget or financial goal involving a merchant at or near the user's location. In this manner, users are informed of budget data (e.g., how much budget remains or if the user would go over budget if a purchase was made from an associated merchant) before a transaction is completed, in contrast to having to wait for a credit card statement or accessing an on-line account after the transaction has already been completed, which may be hours, days or months later.

Figure 1:
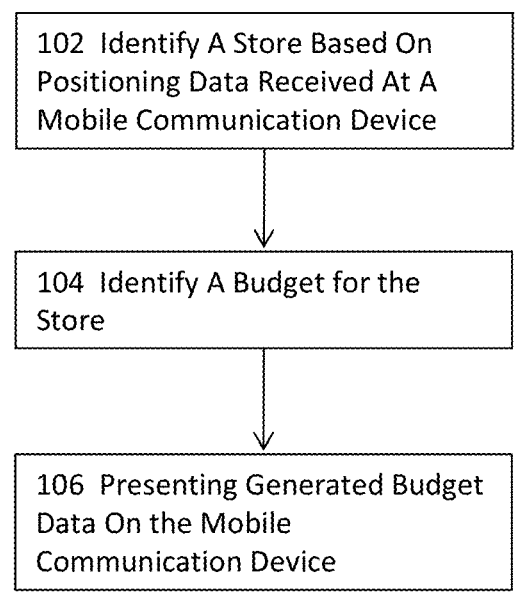
FIG. 1 illustrates a high level flow diagram of a method or system for implementing an antecedent reminder of a budget goal of a user in some embodiments.

FIG. 1 illustrates a high level flow diagram of a method or system for implementing an antecedent reminder of a budget goal of a user in some embodiments. In one or more embodiments, the method or system for implementing an antecedent reminder of a budget goal of a user comprises the process or module 102 for identifying a store based on the positioning data in or received by a mobile communication device that is carried by the user. In some embodiments the user is within or in proximity of the store. In some embodiments, the mobile communication device comprises a mobile computer (e.g., a laptop computer), a mobile Internet device (MID), a personal digital assistant (PDA), an enterprise digital assistant (EDA), a portable media player capable of telecommunication purposes (e.g., an media player with wireless communication capabilities), a portable entertainment device with telecommunication purposes (e.g., a portable gaming device with wireless communication capabilities), a mobile phone, a portable navigation device with telecommunication capabilities, a combination of any of the aforementioned devices, or any devices with telecommunication capabilities.

In some embodiments, the mobile communication device comprises a positioning data receiving circuitry that receives positioning data. In some embodiments, the positioning data comprise data that provide locations or time information from one or more sources. In some embodiments, the one or more sources comprise a satellite-based global navigation satellite system (e.g., a Global Positioning System or GPS), the European Union's Galileo positioning system, the Russian GLObal Navigation Satellite System (GLONASS), an assisted global positioning system (A-GPS), a differential global positioning system (DGPS), an electronic compass system or module, an electronic altimeter, an indoor positioning system (IPS), a hybrid positioning system (HPS), a Wi-Fi position system (WPS), a mobile communication system (e.g., a 3G or 4Ga system according to the International Telecommunications Union), local positioning system (LPS), or any system that provides data or information of location, time, orientation, altitude or elevation.

In some embodiments, a hybrid positioning system (HPS) provides the location of a mobile communication device using multiple positioning modules that receive various types of signals and comprise two or more of a global positioning module, a local positioning module, cell tower signal receiving module, a wireless Internet signal module, or a Bluetooth module. In some embodiments, the local positioning system (LPS) uses local technology or technology having local coverage rather than technologies having global coverage such as the global positioning systems and may comprise one or more cellular base stations, Wi-Fi access points, radio masts and towers for telecommunications and broadcasting. In these embodiments, the local positioning system may be used as complementary positioning technology to a global positioning system in, for example, areas where the global positioning system does not reach or is weak such as the areas inside buildings due to attenuation of GPS signals by construction materials, urban areas where a mobile communication device has limited visibility of satellites.

In some embodiments, the indoor positioning system (IPS) comprises a network of devices that use wireless, optical, radio, or acoustic technologies to provide data or information for location or time. In some embodiments, the Wi-Fi positioning system (WPS) uses wireless access points and one or more databases that include data or information of locations of registered wireless access points to provide data or information for time or locations of a mobile communication device interacting with the WPS. Different positioning systems provide different resolution and accuracy. For example, a consumer global positioning system may have the horizontal accuracy of within 10 feet, while a commercial, encrypted Galileo positioning system provides high horizontal accuracy down to the centimeter. Certain electronic compasses may provide the accuracy of within 10 minutes of a degree, while an electronic altimeter may provide the accuracy of within three feet.

Various embodiments use signals from one or more of the aforementioned systems to discern the location of a mobile communication device carried by a user. For example, when the user is on a large street having large stores spaced sufficiently far (e.g., farther than the accuracy limit of the positioning system) from each other, a consumer GPS system may be more than enough to provide the location of the user. On the other hand, if the user is on a very narrow street (e.g., an eight-foot wide street) with small stores having store front of, for example, no more than 10 feet on both sides of the narrow street, the consumer global positioning system may not provide sufficient resolution and accuracy to discern the location of the user. In this case, the system may use signals from a positioning system with higher accuracy or an electronic compass to find which direction the user is facing or moving to determine the location of the user. In another example, the user may be in a multi-story building with stores on every store. In this example, even a high accuracy global positioning system may not be sufficient by itself to provide accurate location for the user.

For example, some GPS may precisely locate the user's location within three feet, but the GPS may not be able to discern whether the user is on the first floor or the second floor. In this example, the method or the system may either use even higher accuracy GPS, or a less accurate GPS with the aid of an electronic altimeter with provides the elevation or altitude data with the accuracy of two or three feet to correctly discern the location of the user. Most global positioning systems can also determine the altitude of the mobile communication device although the vertical accuracy of most global positioning systems is often 1.5 times of the horizontal accuracy. Therefore, the method or the system may use a global positioning system alone to identify a store based on the positioning data in or received at the mobile communication device in some embodiments or situations, and may use a global positioning system with an electronic compass or an electronic altimeter in some other embodiments or situations. The method or the system may also utilize various other types of wireless signals as described above to determine the location of the user.

In various embodiments, the method or the system may comprise the process or module for using one or more databases, one or more look-up tables, or any other data structures (hereinafter data structure or data structures) to determine the store based at least in part upon the positioning data of the user. In some embodiments, the one or more data structures include data or information that correlate stores and their respective locations.

In some embodiments, the method or the system for implementing an antecedent reminder of a budget goal of a user may comprise the process or module (104) for identifying a budget for the store. In some embodiments, the method or the system for implementing an antecedent reminder of a budget goal of a user may comprise the process or module (106) for presenting generated budgeting data on the mobile communication device to a user. More details of the processes or modules 102, 104, and 106 will be described in some of the subsequent paragraphs with reference to one or more drawing figures.

Figure 2:
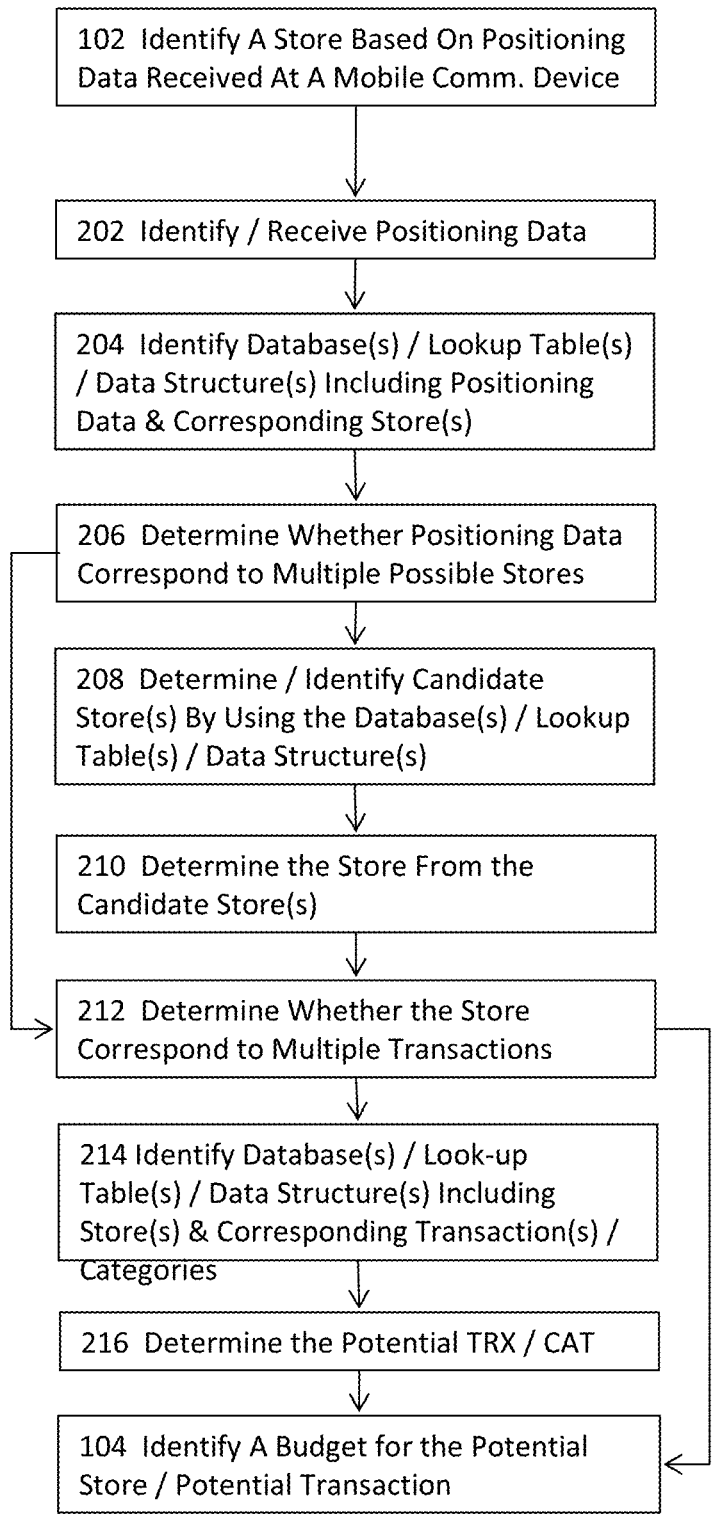
FIG. 2 illustrates a more detailed process flow diagram of a part of the method or system for implementing an antecedent reminder of a budget goal of a user in some embodiments.

FIG. 2 illustrates a more detailed process flow diagram of a part of the method or system for implementing an antecedent reminder of a budget goal of a user in some embodiments. More specifically, FIG. 2 illustrates more details about the process or module (102) for identifying a store based at least in part upon the positioning data in or received at the mobile communication device in some embodiments. In some embodiments, the process or module 102 comprises the process or module (202) for identifying or receiving the positioning data at the mobile communication device.

In these embodiments, the module 202 may comprise an electronic circuitry that receives or identifies positioning signals from various sources as described above with reference to FIG. 1. For example, some embodiments may utilize a global positioning system alone or with the aid of one or more other devices such as an electronic compass, an electronic altimeter, IPS, LPS, HPS, WPS, etc. Some embodiments may not even need a global positioning system and relies entirely upon, for example, the IPS, LPS, or WPS that determines the location of the mobile communication device. In these embodiments, the process 202 may be adapted or programmed for identifying, receiving, or processing the positioning signals from these various sources as described above with reference to FIG. 1.

In some embodiments, the method or the system may determine the store after the user remains in a pre-determined vicinity of a location for a pre-determined period of time. For example, the method or the system constantly updates the positioning data of the user and wait for, for example, five minutes after the user goes into and remains within a store before the method or the system initiates various processes or modules described herein. The pre-determined wait-period may be modified, overridden, snoozed, or even disabled by the user. The user may also disable and stop the method or the system from executing the processes or modules to provide budget alerts. In some embodiments, the process or module 102 comprises the process or module (204) for identifying one or more data structures that include the positioning data and the corresponding stores. In some embodiments, the one or more data structures comprise a first column for the positioning data and a second column for the corresponding stores where each row comprise a store and its respective positioning data, such as its location.

In some embodiments, the one or more data structures may allow for a range of positioning data for a store such that the method or the system may determine the store when the positioning data of the mobile communication device falls within the range of positioning data of the store. In some embodiments, the process or module 102 comprises the process or module (206) for determining whether the positioning data correspond to multiple possible stores. For example, the method or the system may not have access to the positioning system with sufficient accuracy to definitively determine the store that the user is within or in proximity of. In some embodiments where the method or system determines that the positioning data of the mobile communication device correspond to multiple stores, the process or module 102 comprises the process or module (208) for determining or identifying one or more candidate stores by using the one or more data structures that include the stores and their respective positioning data or ranges thereof. For example, the method or the system may determine all the positioning data or ranges thereof that match the positioning data of the mobile communication device and identify the corresponding stores for such positioning data or ranges thereof.

In some embodiments, the process or module 102 comprises the process or module (210) for determine the store that the user is within or in proximity of from the one or more candidate stores. More details about the process or module 210 will be described in some of the subsequent paragraphs with reference to one or more figures. In some embodiments, the process or module 102 comprises the process or module (212) for determining whether the store correspond to transactions that correspond to multiple categories for budgeting purposes. In some embodiments, the entire store may provide only a single provide or service for the budgeting purpose such as "entertainment", "coffee", etc. In these embodiments, the store corresponds to a single budgeting category.

In some embodiments, the store may provide multiple products or services that correspond to multiple categories for budgeting purposes. For example, a super market may sell coffee that is categorized under "coffee", electronic games that is categorized under "entertainment", and usual daily household goods that are categorized under "grocery". In this example, the method or the system may refer to historical transaction data of the user at this particular store and determine that the store corresponds to transactions that are categorized into multiple categories. In some embodiments, the process or module 102 comprises the process or module (214) for identifying one or more data structures that include the stores and their respective types of transactions or categories. It shall be noted that the data structures described throughout this disclosure may comprise a single data structure having all the needed information or data or multiple data structures that jointly provide all the needed information or data.

In some embodiments, the process or module 102 optionally comprises the process or module (216) for determining a potential transaction or a potential category. In some embodiments, the method or the system does not determine a single potential transaction or a single potential category. Rather, the method or the system considers all the candidate transaction types or candidate categories in these embodiments. More details about accounting for multiple transaction types or multiple categories will be described in some of the subsequent paragraphs with reference to one or more figures. The method or the system may then proceed to execute process 104 or invoke module 104.

Figure 3:
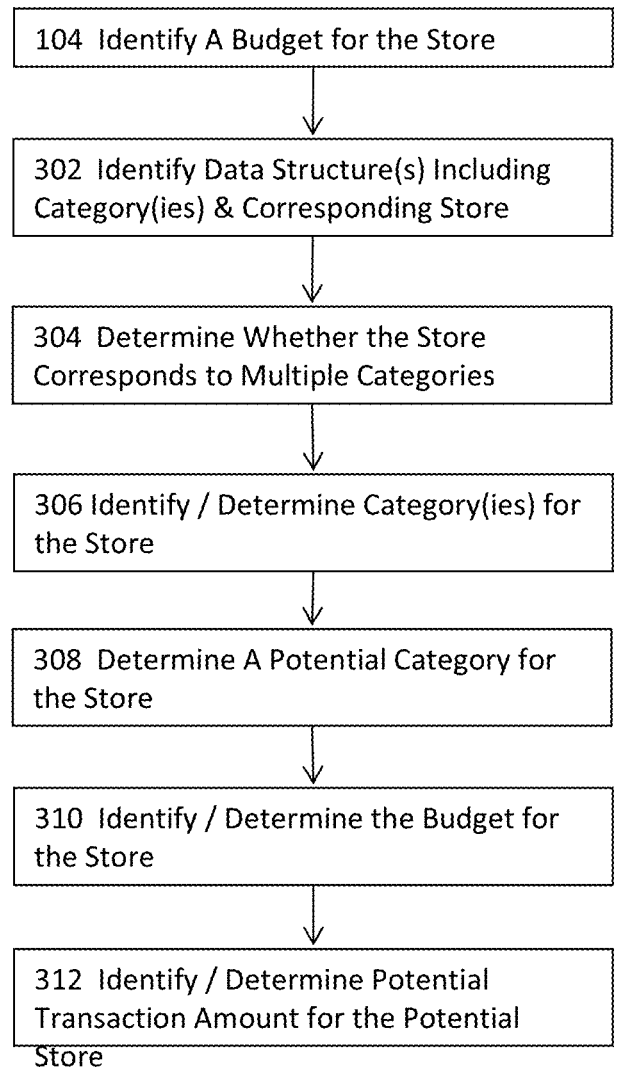
FIG. 3 illustrates a more detailed process flow diagram of a part of the method or system for implementing an antecedent reminder of a budget goal of a user in some embodiments.

FIG. 3 illustrates a more detailed process flow diagram of a part of the method or system for implementing an antecedent reminder of a budget goal of a user in some embodiments. More specifically, FIG. 3 illustrates more details about the process or module 104 for identifying a budget for the store. In some embodiments, the process or module 104 optionally comprises the process or module (302) for identifying one or more data structures that include the data or information of the stores and their respective category(ies). For example, the one or more data structure may comprise a row having the store in the first column and the corresponding categories in separate column of the row.

In some embodiments, the process or module 104 optionally comprises the process or module (304) for determining whether the store corresponds to multiple categories. In some embodiments, the process or module 104 optionally comprises the process or module (306) for identifying or determining the categories for the store. In some embodiments, the method or the system may make the determination at 304 or 306 by checking the number of categories associated with the store in the one or more data structures. In some embodiments, the method or the system may refer to some historical transaction data of the user at the store to determine whether the store corresponds to multiple categories. In these embodiments, the method or the system may pull or receive records from, for example, a personal finance management tools (e.g., Intuit Mint® or Quicken®) that include one or more prior entries and their corresponding categories of the user's transactions at the store. For example, the user may have had one entry for a transaction at a Wal-Mart store that is associated with the "grocery" category and another entry for another transaction at the same Wal-Mart store that is associated with the "electronics" category. The method or the system may pull or receive these records from, for example, Intuit Quicken® and determines that this Wal-Mart store corresponds to the "grocery" and "electronics" categories.

In some embodiments, the process or module 104 optionally comprises the process or module (308) for determining a potential category for the store. In some other embodiments, the method or the system accounts for all the determined categories. More details will be provided in some of the subsequent paragraphs with reference to one or more figures. In some embodiments, the process or module 104 comprises the process or module (310) for identifying or determining the budget for the store. In some embodiments, the method or the system may determine the budget by checking the data that are stored in a local memory of the mobile communication device or by passing the store information to a remote computer running a financial management system.

Various processes or modules described for the financial management system herein may be one or more stand-along products executing on or accessible by the intermediate or host computer or may be a part of a desktop or on-line financial management system such as Intuit MINTED or QUICKEN®, available from Intuit Inc., and which are linked to various consumer accounts to receive or retrieve item-level data within accounts. Such systems may categorize and display receipt and financial data to a user. Various processes described herein may be a part of an accounting program such as INTUIT PAYROLL SERVICES® or QUICKBOOKS®, available from Intuit Inc. and other programs, that allow a user to manage payroll, inventory, sales, business transactions, and other business matters such that various embodiments may be utilized to perform their intended functions.

The term financial management system is defined to include, any computing system implemented, on-line or web-based, system, package, program, module, or application that gathers financial data, has the capability to receive or retrieve financial data including item-level electronic transaction data, analyze and categorize at least part of the financial data into various reports or displays that are provided to consumer, and provides consumer with the capability to conduct, and/or monitor, financial transactions. Various types of financial management systems include, but are not limited to any of the following: an on-line, or web-based, or computing system implemented receipt collection financial management system, package, program, module, or application (generally, "system"), personal financial management system, personal accounting system, personal asset management system, personal/home business inventory system, business accounting system, business financial management system, business inventory system, business asset management system, healthcare expense tracking system, and data management system as discussed herein, and/or as known in the art at the time of filing, and/or as developed after the time of filing.

Specific examples of financial management systems currently available and may be utilized to implement embodiments include, but are not limited to: QUICKEN®, QUICKEN On-Line®, QUICKBOOKS®, QUICKBOOKS On-Line®, FINANCEWORKS®, PayCycle®, Mint.com™ and Intuit Payroll Services®, all of which are available from Intuit Inc. of Mountain View, Calif.; MICROSOFT Money of Microsoft, Inc. of Redmond, Wash.; and various other financial management systems.

In some embodiments, the process or module 104 comprises the process or module (312) for identifying or determining a potential transaction amount for the potential store. It shall be noted that some embodiments refer to the term "potential" to indicate that the processes are executed or the modules are invoked prior to the initiation or completion of the transaction at a store to provide antecedent location-based budget alert and also to indicate the fuzziness in the logic of various processes or modules described herein because the method or the system does not have knowledge about what the user's true intent at a particular store.

Figure 4:
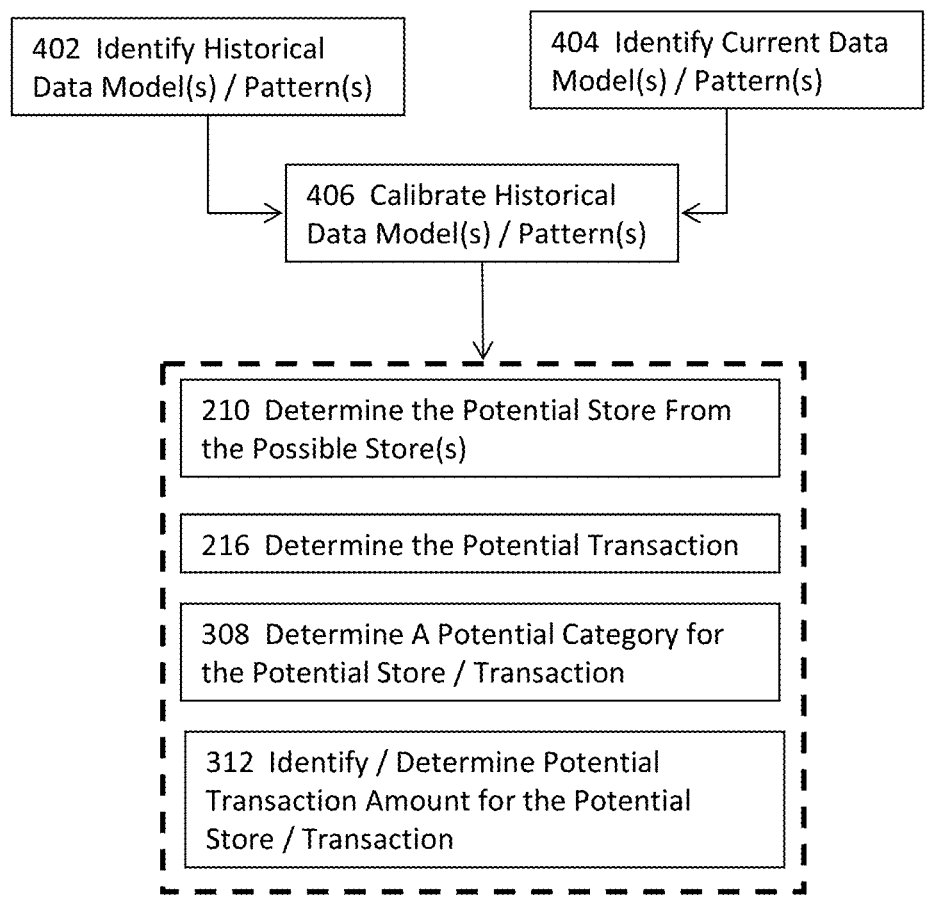
FIG. 4 illustrates some additional, optional details about the method or system for implementing an antecedent reminder of a budget goal of a user in some embodiments.

FIG. 4 illustrates some additional, optional details about the method or system for implementing an antecedent reminder of a budget goal of a user in some embodiments. In some embodiments, the method or the system may comprise the process or module (402) for identifying historical data, historical data models, or historical data patterns (hereinafter historical data) for the user. In some embodiments, the historical data comprise prior transaction types or categories at one or more stores during one or more prior periods of time, prior transaction amounts for one or more categories during one or more prior periods of time, prior transaction amounts for one or more stores during one or more prior periods of time, positioning data of one or more stores that the user has visited during one or more prior periods of time, prior spending pattern of the user during one or more prior periods of time, prior spending pace of the user during one or more prior periods of time, and any other historical data that may facilitate various purposes or functions of various processes or modules of the method or the system.

For example, the historical data may indicate that the user to a particular Wal-Mart store in late July to purchase stationery that is categorized into "education" to prepare the user's children for the upcoming school session, that the user went to this particular Wal-Mart in mid-November to purchase gifts that are categorized into "Gift", and that the user usually went to this particular Wal-Mart store to purchase usual, daily household supplies that are categorized into "Grocery" on weekends.

In some embodiments, the method or the system may optionally comprise the process or module (404) for identifying current data, data models, or data patterns (hereinafter current data) for the user. In some embodiments, the method or the system may optionally comprise the process or module (406) for calibrating the historical data by using the current data. In some embodiments, the method or the system may use the current data to verify the integrity or the degree or extent that the historical data match the current data. In other words, the method or the system may compare the current data with the historical data to determine how well the historical data resemble the current data in these embodiments.

For example, the method or the system may compare the category information of one or more stores in the historical data with the category information of the one or more stores in the current data to determine whether there is a change of categorization. The method or the system may determine whether there is a change in the user's spending patterns in, for example, the average amount spent per transaction at a store, the times of the transactions at a particular store, the same types of transactions at different stores, the categories of the transactions at the same stores, etc. One or more of the processes or modules of 402, 404, and 406 may be applied to various other processes or modules described herein in some embodiments. For example, one or more of the processes or modules of 402, 404, and 406 may be applied to one or more of the processes or modules of 210, 216, 308, 312, etc.

Figure 5:
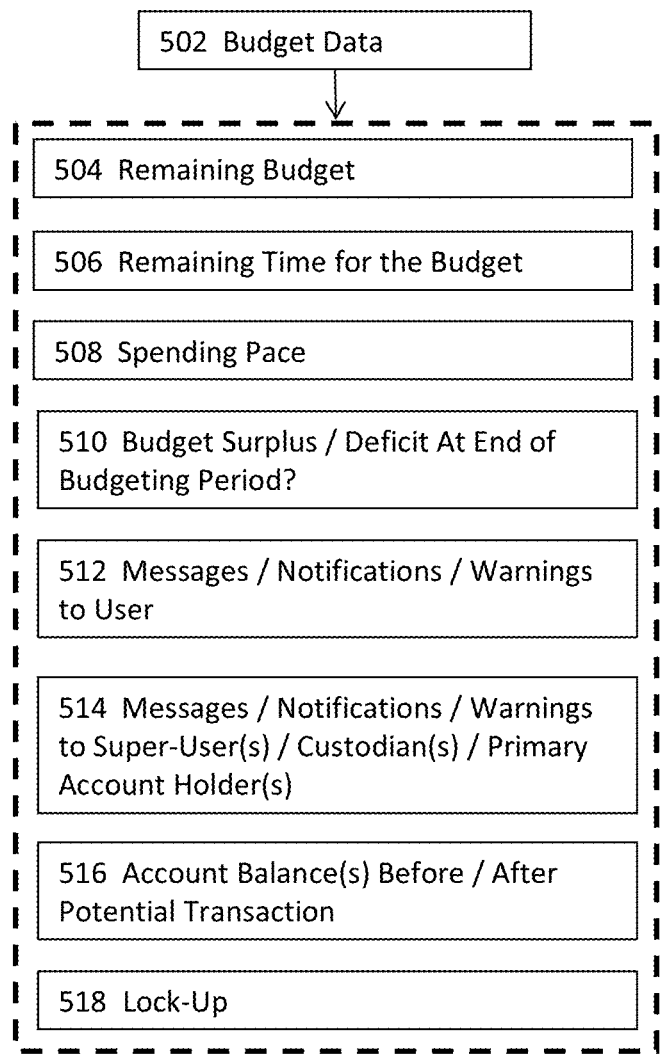
FIG. 5 illustrates some exemplary types of budget data in some embodiments.

FIG. 5 illustrates some exemplary types of budget data in some embodiments. It shall be noted that the list illustrated in FIG. 5 is not intended to be exhaustive and may further other types of budget data and thus should not be interpreted as limiting the scope of various embodiments or the scope of the claims, unless otherwise explicitly specified in the various embodiments or in the claims. In some embodiments, the budget data (502) may comprise how much money is remaining for the allocated budget at the time of execution of the method or the system (504).

In some embodiments, the budget data (502) may comprise the time that still remains in the current budgeting period (506). In some embodiments, the budget data (502) may comprise the spending pace of the user for the budget under consideration (508). For example, the budget data 502 may indicate that the user has spent 33% of the budget with 80% time remaining in the current budgeting period. In some embodiments, the budget data (502) may comprise a prediction of whether and when the budget will be used up or whether there will be surplus at the end of the current budgeting period (510).

In some embodiments, the budget data (502) may comprise one or more messages, notifications, or warnings to the user (512). In some embodiments, the budget data (502) may comprise one or more messages, notifications, warnings, or approval requests to a super-user, a custodian, or a primary account holder that holds the authority over some transactions. For example, the method or the system may send a notice, a message, or a warning to the parent of a minor who is at a location associated with a store that the minor has previously conducted some expensive transactions.

In some embodiments where the user may initiate the transaction with the mobile communication device, the method or the system may also send a notice, a warning, or an approval request to the custodian or the primary account holder (e.g., the user's parent) that the user has initiated a transaction at the store. If the method or the system sends an approval request, the method or the system may further awaits the approval or rejection for the transaction. If the method or the system receives an approval for the transaction, the method or the system may proceed further. If the method or the system receives a rejection for the transaction, the method or the system may lock up a part of the mobile communication device (e.g., payment processes) to prevent the user from completing the transaction.

In some embodiments, where the potential transaction may be beyond the authority of the user, the method or the system may also send a notice, a warning, or an approval notice to the super-user, such as the user's management, to seek approval or rejection for the potential transaction. In some embodiments, the budget data (502) may comprise account balance of one or more accounts before or after the potential transaction (516). In some embodiments, the method or the system provides the account balances before or after the transaction (such as the outstanding balance of a credit card) before the completion of the transaction such that the user may be aware of such outstanding balances. In some embodiments, the budget data (502) may comprise a lock-up notice or warning to the user to indicate that certain functions have been locked up so the method or the system may no longer proceed with the potential transaction at this store at this time.

Figure 6:
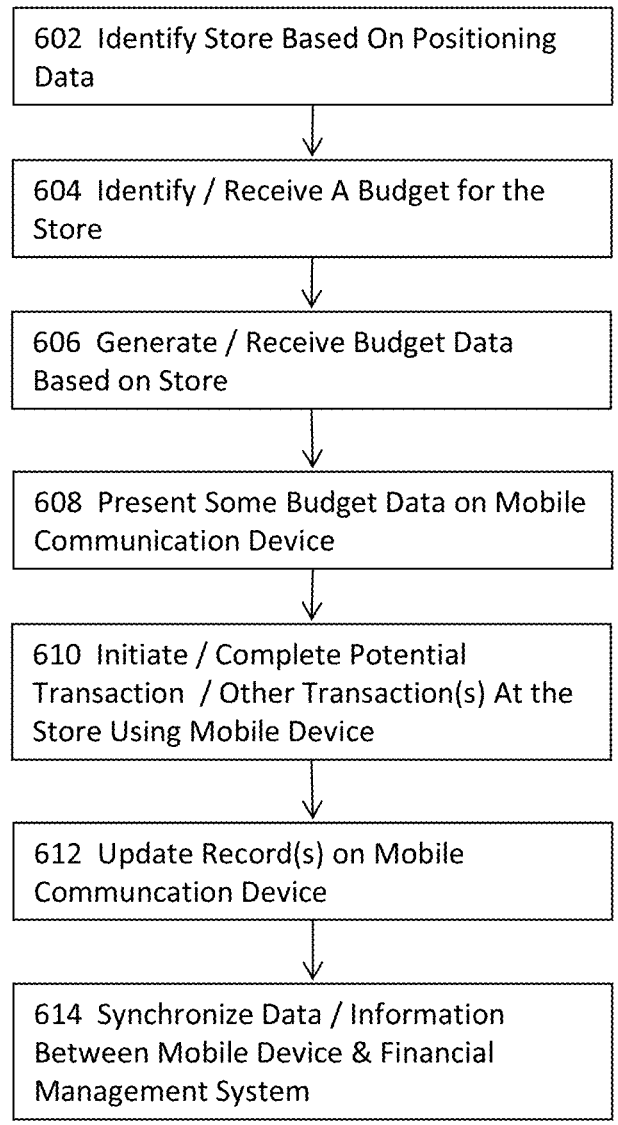
FIG. 6 illustrates some additional, optional details about the method or system for implementing an antecedent reminder of a budget goal of a user in some embodiments.

FIG. 6 illustrates some additional, optional details about the method or system for implementing an antecedent reminder of a budget goal of a user in some embodiments. In some embodiments, the method or the system for implementing an antecedent reminder of a budget goal of a user comprise the process or module (602) for identifying a store based on the positioning data in or received by the mobile communication device carried by a user where the user is inside or in proximity of the store in a substantially similar manner as that described in some of the preceding paragraphs with references to one or more figures.

In some embodiments, the method or the system for implementing an antecedent reminder of a budget goal of a user comprise the process or module (604) for identifying or receiving a budget for the store. The budget may be identified from the records of a financial management system that are either stored on a remote computing node accessible by the financial management system in some embodiments or are cached on the local memory of the mobile communication device carried by the user in some other embodiments.

In some embodiments, the method or the system for implementing an antecedent reminder of a budget goal of a user comprise the process or module (606) for generating or receiving budget data based at least on the store that is determined at 602. In some embodiments, the budget data may be generated by the financial management system and pushed to or pulled by the mobile communication device through, for example, an application programming interface (API). In some other embodiments, the budget data may be generated by various processes or modules on the mobile communication device.

In some other embodiments, the budget data may be jointly generated by the financial management system and various processes or modules of the mobile communication device, and the part of the budget data generated by the financial management system may be pushed to or pulled by the mobile communication device from the financial management system. In some embodiments, the method or the system for implementing an antecedent reminder of a budget goal of a user comprise the process or module (608) for presenting at least some budget data to the user on the mobile communication device. More details about the budget data are described in some of the preceding paragraphs with reference to FIG. 5.

In some embodiments, the method or the system for implementing an antecedent reminder of a budget goal of a user comprise the process or module (610) for using the mobile communication device to initiate or complete a potential transaction or one or more other transactions at the store. In these embodiments, the mobile communication device essentially comprises the processes or modules to function as a mobile wallet. In some embodiments, the mobile communication device uses SMS (Short Message Service) text message based transactional payments to function as a mobile wallet.

In some embodiments, the mobile communication device uses the direct mobile billing process to function as a mobile wallet. In some embodiments, the mobile communication device uses the contactless near field communication technique to function as a mobile wallet. In some embodiments, the mobile communication device uses the mobile web payments techniques to function as a mobile wallet. In some embodiments, the method or the system for implementing an antecedent reminder of a budget goal of a user comprise the process or module (612) for updating records on the mobile communication device. For example, upon the completion of the potential transaction at the store, the method or the system may update the budget for the corresponding category to reflect the transaction amount.

The method or the system may also update other data that are pushed by or pulled from various processes or applications on the financial management system. In some embodiments, the method or the system for implementing an antecedent reminder of a budget goal of a user comprise the process or module (614) for synchronizing data or information between the mobile communication device and the financial management system. The method or the system may push or pull the data or information from the mobile communication device or vice versa.

Figure 7:
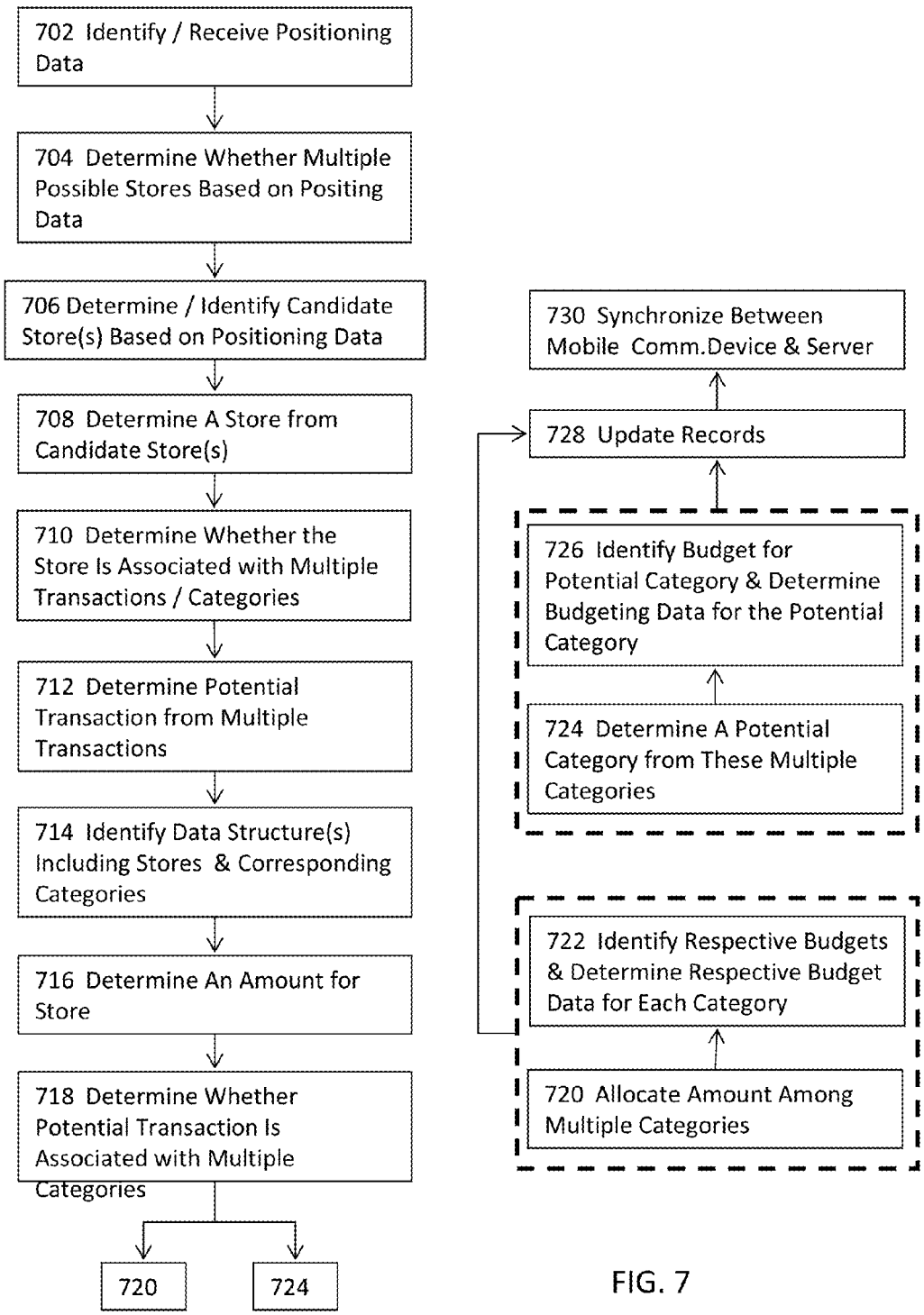
FIG. 7 illustrates a more detailed, high level flow diagram for the method or system for implementing an antecedent reminder of a budget goal of a user in some embodiments.

FIG. 7 illustrates a more detailed, high level flow diagram for the method or system for implementing an antecedent reminder of a budget goal of a user in some embodiments. In some embodiments, the method or the system for implementing an antecedent reminder of a budget goal of a user comprises the process or module (702) for identifying or receiving positioning data by a mobile communication device carried by a user. In some embodiments, the method or the system for implementing an antecedent reminder of a budget goal of a user comprises the process or module (704) for determining whether the positioning data correspond to multiple possible stores. In some embodiments, the positioning data may correspond to multiple candidate stores due to insufficient resolution of the positioning system or due to the close proximity or arrangement of the candidate stores.

In some embodiments, a store may comprise a brick and mortar store. In some embodiments, a store may comprise a stand (e.g., a newsstand) that sells certain products or offers certain services. In some embodiments, the method or the system for implementing an antecedent reminder of a budget goal of a user comprises the process or module (706) for determining or identifying one or more candidate stores based at least in part on the positioning data. In some embodiments, the method or the system may determine or identify one or more candidate stores by using one or more data structures that include stores and their respective positioning data or ranges thereof. In some embodiments, the method or the system for implementing an antecedent reminder of a budget goal of a user comprises the process or module (710) for determining whether the store is associated with multiple transactions or multiple categories. For example, the method or the system may determine whether the store is associated with multiple transactions or multiple categories by using one or more data structures including data or information that correlates the stores and their respective transaction types or categories in some embodiments.

The method or the system may also determine whether the store is associated with multiple transactions or multiple categories by using data or information from the financial management system providing prior transaction records or categorization results for one or more stores. In some embodiments, the method or the system for implementing an antecedent reminder of a budget goal of a user may optionally comprise the process or module (712) for determining one or more potential transactions or potential categories from the multiple transactions or multiple categories. In some embodiments, the method or the system may determine a single potential transaction or a single potential category. In some embodiments, the method or the system may determine multiple potential transactions or multiple potential categories.

In some embodiments, the method or the system may account for all the multiple transactions or all of the multiple categories. In some embodiments, the method or the system for implementing an antecedent reminder of a budget goal of a user comprise the process or module (714) for identifying one or more data structures that include data or information that correlates the stores and their corresponding categories or transactions. In some embodiments, the method or the system for implementing an antecedent reminder of a budget goal of a user comprise the process or module (716) for determining a potential transaction amount for the store.

In some embodiments, the method or the system may use statistical analysis techniques to determine a potential transaction amount based at least in part on historical data in one or more prior time periods. In some embodiments, the method or the system may use mathematical or arithmetic techniques to determine a potential transaction amount based at least in part upon current or more recent data. For example, the method or the system may determine the potential transaction amount by calculating the average transaction amount from similar transactions at a particular store during a similar time period in one or more previous years. In some embodiments, the method or the system for implementing an antecedent reminder of a budget goal of a user optionally comprises the process or module (718) for determining whether the one or more potential transactions are associated with multiple categories.

In some embodiments where the store or the one or more potential transactions are determined to be associated with multiple categories, the method or the system may further comprise the process or module for allocating the potential transactional amount among the determined, multiple categories at 720. In these embodiments, the method or the system may further comprise the process or module for identifying the respective budgets and determining the respective budget data for each of the determined, multiple categories. The method or the system may then proceed to 728 to optionally update one or more records on the mobile communication device and then to 730 to optionally perform synchronization between the mobile communication device and a remote computing node.

In some embodiments where the method or the system determines that the one or more potential transactions or the store is associated with multiple categories at 718, the method or the system may alternatively comprise the process or module for determining a single potential category from the determined, multiple categories at 724 and then proceed to 726 to identify the corresponding budget for the single potential category and to determine the budget data for the single potential category. In these latter embodiments, the method or the system may then optionally proceed to 728 and then 730 upon the completion of 726.

Figure 8:
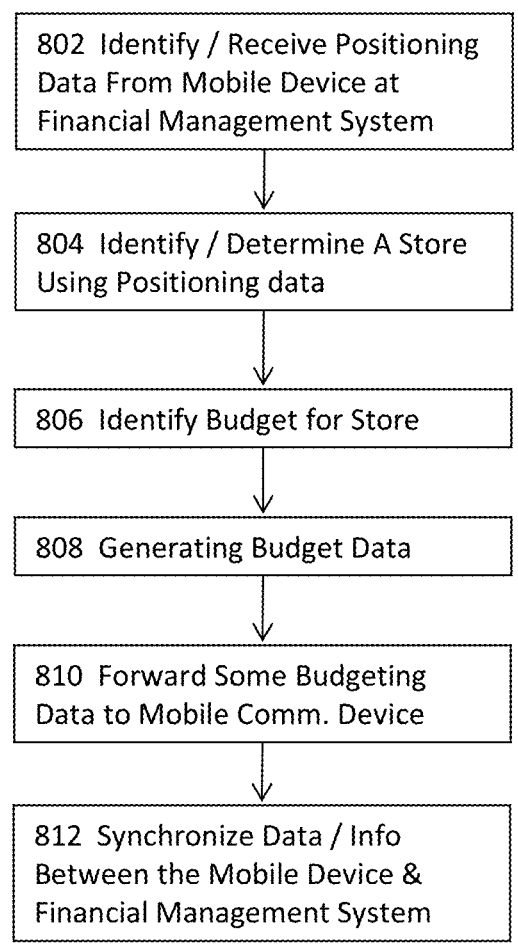
FIG. 8 illustrates a high level flow diagram of a method or system for implementing an antecedent reminder of a budget goal of a user in some embodiments.

FIG. 8 illustrates a high level flow diagram of a method or system for implementing an antecedent reminder of a budget goal of a user in some embodiments. In some embodiments, the method or the system for implementing an antecedent reminder of a budget goal of a user may comprise the process or module (802) for identifying or receiving, at the financial management system, positioning data of the mobile communication device. In some embodiments, the method or the system for implementing an antecedent reminder of a budget goal of a user may comprise the process or module (804) for identifying or determining a store based at least in part upon the positioning data of the mobile communication device.

In some embodiments, the method or the system for implementing an antecedent reminder of a budget goal of a user may comprise the process or module (806) for identifying a budget for the store. In some embodiments, the method or the system for implementing an antecedent reminder of a budget goal of a user may comprise the process or module (808) for generating the budget data based at least in part upon the determined or identified store or its corresponding category. In some embodiments, the method or the system for implementing an antecedent reminder of a budget goal of a user may comprise the process or module (810) for forwarding at least some budget data to the mobile communication device from the financial management system. In some embodiments, the method or the system for implementing an antecedent reminder of a budget goal of a user may comprise the process or module (812) for synchronizing data or information between the mobile communication device and the financial management system. In some embodiments, both the mobile communication device and the financial management system may push data to or pull data from each other.

Figures 9A, 9B:
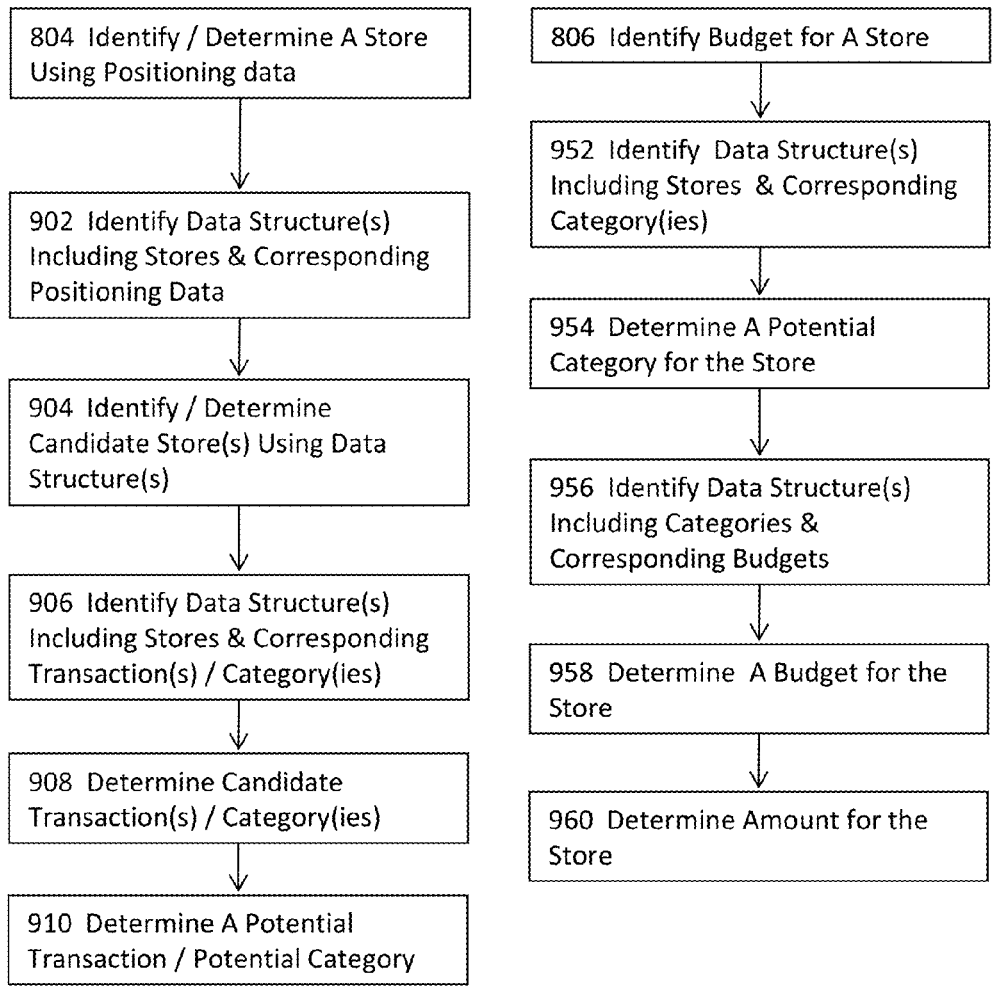
FIGS. 9A-B illustrate more details about more details about some parts of the method or system for implementing an antecedent reminder of a budget goal of a user illustrated in FIG. 8 in some embodiments.

FIGS. 9A-B illustrate more details about more details about some parts of the method or system for implementing an antecedent reminder of a budget goal of a user illustrated in FIG. 8 in some embodiments. More specifically, FIG. 9A illustrates more details for the process or module 804 for identifying a store based at least in part upon the positioning data that are in or received by the mobile communication device and are further forwarded to the financial management system for determination of a store. In some embodiments, the process or module 804 may comprise the process or module (902) for identifying one or more data structures that include data or information that correlate the stores and their respective positioning data or ranges thereof.

In some embodiments, the process or module 804 may comprise the process or module (904) for identifying or determining one or more candidate stores by using at least one or more data structures that include data or information that correlate stores and their respective positioning data. In some embodiments, the process or module 804 may comprise the process or module (906) for identifying one or more data structures that include data or information that correlate the stores and their respective transactions/transaction types or budget categories. In some embodiments, the process or module 804 may comprise the process or module (908) for determining one or more candidate transactions or candidate transaction types or one or more budget categories. In some embodiments, the process or module 804 may optionally comprise the process or module (910) for determining a potential transaction/transaction type or a potential category. In some embodiments, the method or system determines a single potential category or a potential transaction/transaction type from one or more categories or transactions/transaction types associated with the store. In some embodiments, the method or the system takes all the one or more transactions/transaction types or categories into consideration.

FIG. 9B illustrates more details for the process or module 806 for identifying a budget for a store. In some embodiments, the process or module 804 may comprise the process or module (952) for identifying one or more data structures that include data or information that correlate the stores and their respective budget categories. In some embodiments, the process or module 804 may comprise the process or module (954) for determining a potential category for the store by using the one or more data structures. In some embodiments, the method or the system may use prior transaction data of the user that indicate what categories into which various transactions the user has conducted at the particular store have been categorized.

In some embodiments, the prior transaction data may be received from or pulled from the financial management system. In some embodiments, the process or module 804 may comprise the process or module (956) for identifying one or more data structures that include data or information that correlate various budget categories and their corresponding budgets. In some embodiments, the process or module 804 may comprise the process or module (958) for determining a budget for the determined store. In some embodiments, the process or module 804 may comprise the process or module (960) for determining a potential transaction amount for the determined store. In some embodiments, the method or the system may determine the potential transaction amount by calculating an average transaction amount from the user's prior transactions at the store. In some embodiments, the method or the system may determine the potential transaction amount by calculating an average transaction amount from the user's prior transaction at the store in similar time periods of one or more prior years.

Figure 10A:
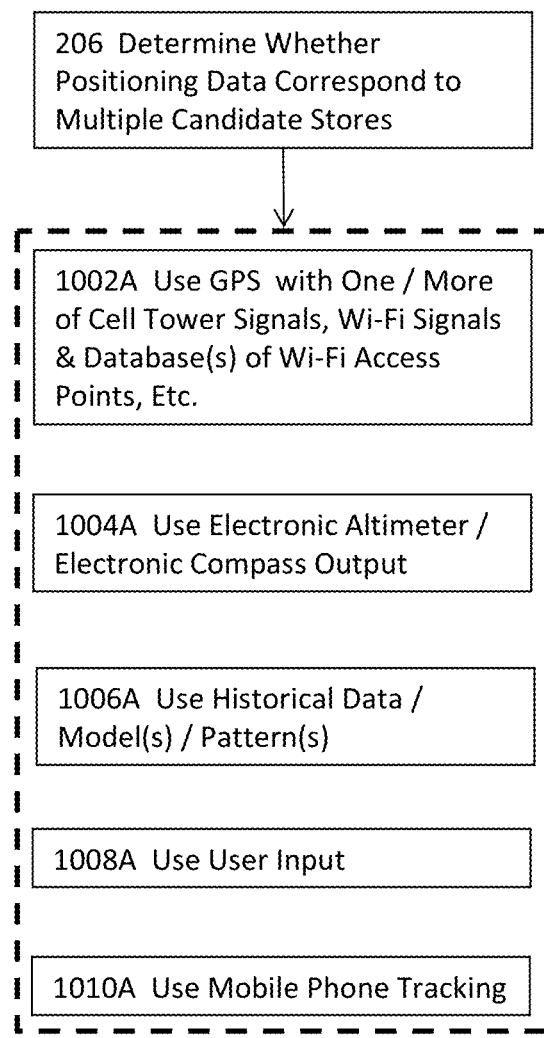
FIGS. 10A-C illustrate more details about some parts of the method or system for implementing an antecedent reminder of a budget goal of a user in some embodiments.
Figure 10B:
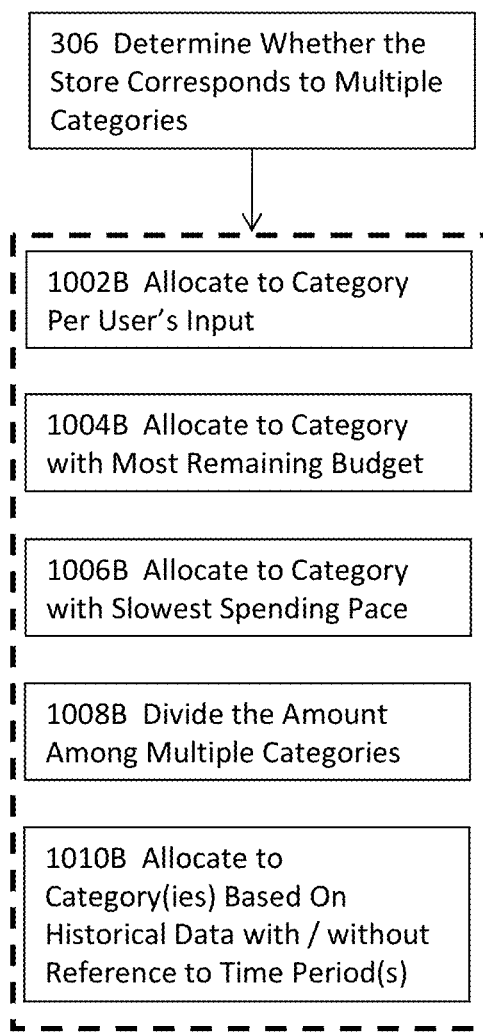
Figure 10C:
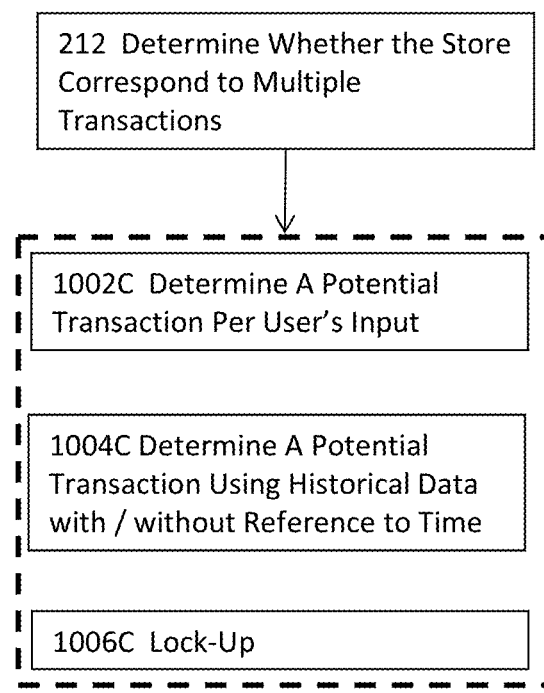

FIGS. 10A-C illustrate more details about some parts of the method or system for implementing an antecedent reminder of a budget goal of a user in some embodiments. FIG. 10A illustrates some exemplary processes of the process or module 206 for determining whether the positioning data correspond to multiple candidate stores in some embodiments. In some embodiments, the process or module 206 for determining whether the positioning data correspond to multiple candidate stores comprise the process or module (1002A) for receiving or processing global positioning system signals with a process or module for receiving or processing cell tower signals, Wi-Fi signals together with one or more databases including positioning or location data of Wi-Fi access points.

In some embodiments, the process or module 206 for determining whether the positioning data correspond to multiple candidate stores comprise the process or module (1004A) for processing or receiving signals from an electronic altimeter module or an electronic compass. In some embodiments, the process or module 206 for determining whether the positioning data correspond to multiple candidate stores comprise the process or module (1006A) for receiving or identifying historical data. In some embodiments, the historical data may indicate which stores at or around a particular location that the user has most visited. In some embodiments, the process or module 206 for determining whether the positioning data correspond to multiple candidate stores comprise the process or module (1008A) for identifying or receiving a user's input to determine whether the positioning data correspond to multiple candidate stores.

In some embodiments, the process or module 206 may present a list of stores for the user to provide an input for the candidate stores. In some embodiments, the process or module 206 for determining whether the positioning data correspond to multiple candidate stores comprise the process or module (1010A) for using mobile phone tracking technique to determine whether the positioning data correspond to multiple candidate stores. In some embodiments where the mobile communication device comprises a module having the capability of interaction with the mobile phone tracking system to determine the location of the mobile communication device, the process or module 1010A may directly interact with the mobile phone tracking system to determine the location of the mobile communication device with or with the additional positioning data from, from example, a GPS module, an electronic compass, an electronic altimeter, or any other positioning modules.

FIG. 10B illustrates some exemplary processes after the process or module 306 determines that the store corresponds to multiple candidate categories in some embodiments. In some embodiments where the process or module 306 determines that the store corresponds to multiple candidate categories, the method or the system may comprise the process or module (1002B) for allocating the potential transaction amount to a single potential category selected from the multiple candidate stores based at least in part upon the user's input. For example, the method or the system may present a list of the multiple candidate stores to the user and await the user's selection of the single candidate store from the multiple candidate stores. In some embodiments where the process or module 306 determines that the positioning data correspond to multiple candidate stores, the method or the system may comprise the process or module (1004B) for allocating the potential transaction amount to one or more potential categories with the most remaining budgets in either absolute dollar values or in relative percentages before or after the potential transaction. For example, if the method or system determines that the store that the user is in or in proximity of corresponds to categories A, B, and C, where categories A and B both have 80% budget remaining, the method or the system may allocate the potential transaction amount between categories A and B in some embodiments.

In some embodiments, the method or the system may allocate the potential transaction amount to the category with the slowest spending pace (1006B). In some embodiments, the method or the system may equally allocate the potential transaction amount among multiple categories (1008B). In some embodiments, the method or the system may assign different weights to different categories based at least in part upon, for example, the remaining budget of each category (e.g., in relative percentage term or in absolute value term). In some embodiments where the process or module 306 determines that the positioning data correspond to multiple candidate stores, the method or the system may comprise the process or module (1010B) for allocating the potential transaction amount to one or more categories based at least in part on some historical data. For example, the method or the system may refer to some prior spending patterns or some prior transaction data from, for example, the financial management system, to identify similar transactions at the same or similar store and use the prior transaction data or spending patterns to allocate the potential transaction amount in some embodiments.

For example, the method or the system may refer to some prior spending patterns or some prior transaction data to identify similar transactions at the same or similar store in one or more similar periods of time in one or more previous years and use the prior transaction data or spending patterns to allocate the potential transaction amount in some embodiments. In some embodiments, the method or the system may use any combination of allocation schemes of 1002B, 1004B, 1006B, 1008B, and 1010B to allocate the potential transaction amount among multiple categories.

FIG. 10C illustrates some exemplary processes after the process or module 212 determines that the store corresponds to multiple candidate transactions in some embodiments. In some embodiments where the process or module 212 determines that the store corresponds to multiple candidate transactions, the method or the system may comprise the process or module (1002C) for determining a single potential transaction based at least in part upon the user's input. For example, the method or the system may present a list of the multiple candidate transactions to the user and await the user's selection of the single candidate transaction from the multiple candidate transactions. In some embodiments where the process or module 212 determines that the store corresponds to multiple candidate transactions, the method or the system may comprise the process or module (1004C) for determining a single potential transaction using historical data. For example, the method or the system may refer to some prior spending patterns or some prior transaction data from, for example, the financial management system, to identify similar transactions at the same or similar store and use the prior transaction data or spending patterns to determine a single potential transactions from the identified, multiple transactions in some embodiments.

For example, the method or the system may refer to some prior spending patterns or some prior transaction data to identify similar transactions at the same or similar store in one or more similar periods of time in one or more previous years and use the prior transaction data or spending patterns to determine the single, potential transaction from the identified, multiple transactions in some embodiments. In some embodiments where the process or module 212 determines that the store corresponds to multiple candidate transactions, the method or the system may further lock up some processes or modules such that the user may no longer initiate or complete any of the multiple candidate transactions due to the nature of some of the multiple candidate transactions.

Figure 11:
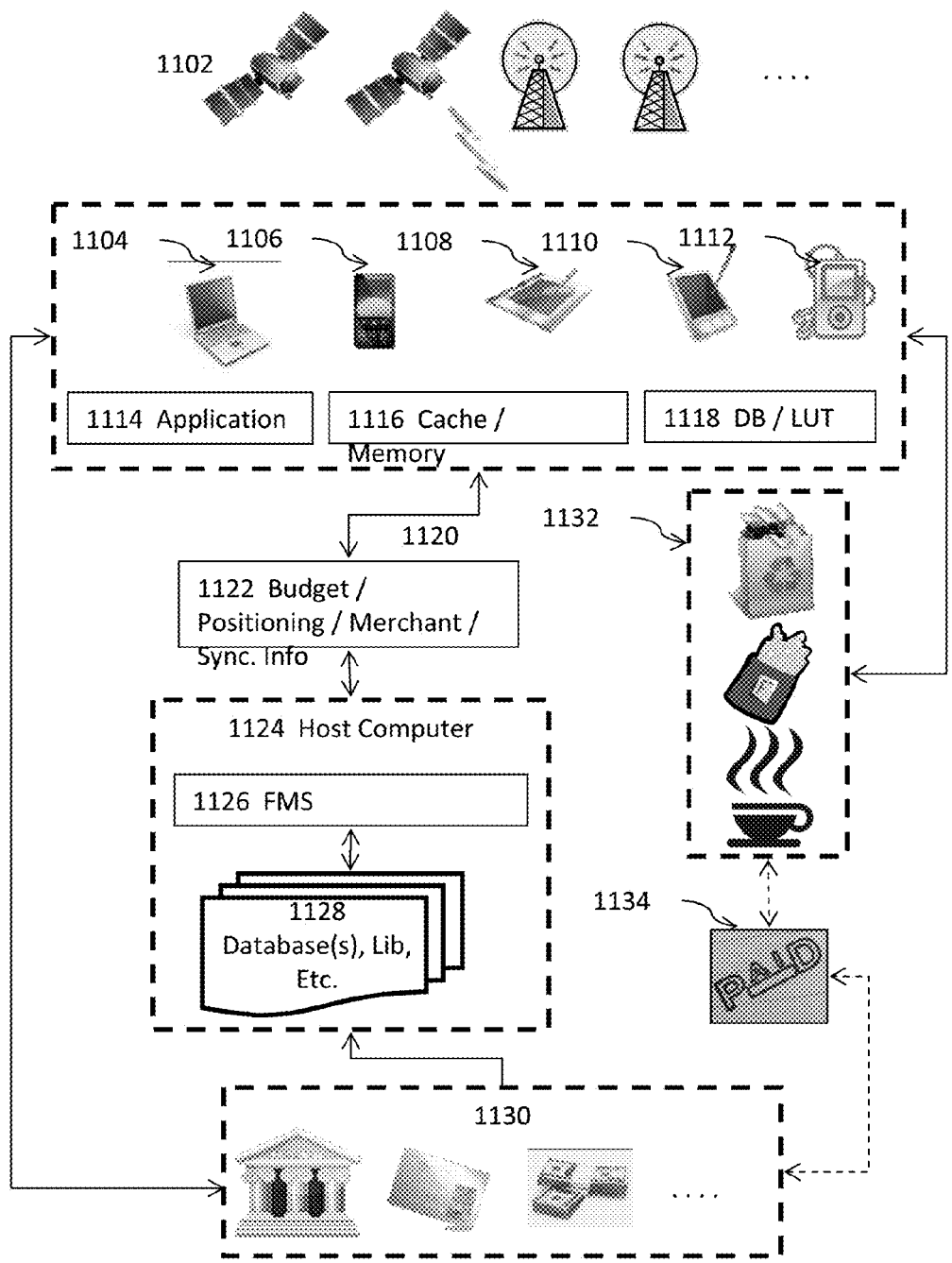
FIG. 11 illustrates an exemplary system for implementing various embodiments of processes or modules described herein in some embodiments.

FIG. 11 illustrates an exemplary configuration of multiple systems interacting with each other to utilize various processes or modules described herein in some embodiments. FIG. 11 illustrates a user using one or more types of mobile communication devices such as a laptop computer 1104, a mobile phone 1106, a tablet 1108, a personal or enterprise digital assistant 1110, a portable media player 1112, etc. to interact with, via a first wireless network, one or more positioning systems 1102 in some embodiments. The mobile communication device (1104, 1106, 1108, 1110, and 1112) may comprise one or more applications 1114 such as various processes or modules described herein, a physical memory 1116, or one or more data structures 1118 in some embodiments.

The mobile communication device (1104, 1106, 1108, 1110, and 1112) may further be configured to interact with, via a second network 1120, a financial management system (FMS) 1126 that is hosted by a host computer 1124 in some embodiments. The host computer 1124 may further comprise or interact with one or more storage devices 1128 that include one or more databases, libraries, etc. in some embodiments. The financial management system 1126 reads from and writes to the storage device 1128 and provides budget data, store data or information, or any other data or information (1122) needed to perform various processes described herein to the mobile communication device (1104, 1106, 1108, 1110, and 1112) in some embodiments. The mobile communication device (1104, 1106, 1108, 1110, and 1112) also provides, for example, the positioning data in or received by the mobile communication device to the financial management system or to other modules on the host computer 1124 to make various identifications or determinations as described herein in some embodiments.

The host computer or the financial management system may also interact with, via a third network, various financial institutions 1130 such as credit card companies, banks, brokerage firms, etc. to pull or receive various types data or information from the financial institutions in some embodiments. The host computer 1124 or the financial management system may also interact with the financial institution(s) to initiate or complete one or more transactions for the user in some embodiments. The mobile communication device (1104, 1106, 1108, 1110, and 1112) may be used to initiate or complete one or more transactions at various stores 1132, which will process the payment data or information through their respective payment gateway 1134 that is also securely linked to the financial institutions 1130 to ensure that the mobile communication device invokes a proper payment method to complete the one or more transactions in some embodiments.

Figure 12:
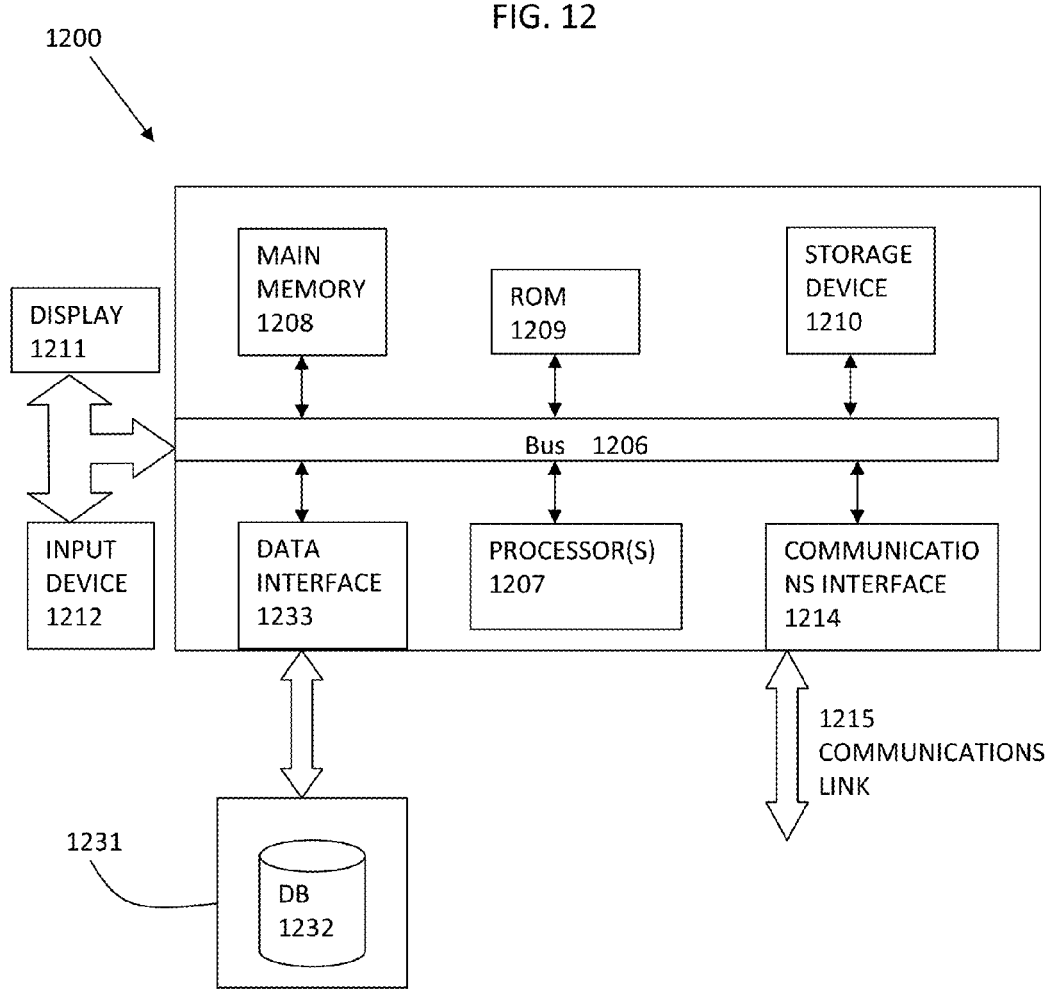
FIG. 12 illustrates a block diagram of an illustrative computing system suitable for implementing various embodiment of the invention.

FIG. 12 illustrates a block diagram of components of an illustrative computing system 1200 suitable for implementing various embodiment of the invention. For example, the exemplary computing system 1200 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 1200 includes a bus 1206 or other communication mechanism for communicating information, which interconnects subsystems and devices, such as processor 1207, system memory 1208 (e.g., RAM), static storage device 909 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control (not shown).

According to one embodiment of the invention, computer system 1200 performs specific operations by one or more processors or processor cores 1207 executing one or more sequences of one or more instructions contained in system memory 1208. Such instructions may be read into system memory 1208 from another computer readable/usable storage medium, such as static storage device 1209 or disk drive 1210. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 1207 may be used to perform various actions such as various actions, processes, or modules involving determining, analyzing, performing actions, etc. In some embodiments, at least one of the one or more processors or processor cores 1207 has the multithreading capability.

In one embodiment, the term "logic" shall mean any combination of software or hardware that is used to implement all or part of the invention. In the single embodiment or in some embodiments, the one or more processors or processor cores 1207 may be used to perform various acts such as various acts involving determining, analyzing, performing actions, etc. In some embodiments, at least one of the one or more processors or processor cores 1207 has the multithreading capability to execute a plurality of threads to perform various tasks as described in the preceding sections.

Various actions as described in the preceding paragraphs may be performed by using one or more processors, one or more processor cores, or combination thereof 1207. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 1200 coupled by communication link 1215 (e.g., LAN, PTSN, or wireless network) may perform the sequence of instructions required to practice the invention in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. In an embodiment, the computer system 1200 operates in conjunction with a data storage system 1231, e.g., a data storage system 1231 that contains a database 1232 that is readily accessible by the computer system 1200. The computer system 1200 communicates with the data storage system 1231 through a data interface 1233. A data interface 933, which is coupled to the bus 1206, transmits and receives electrical, electromagnetic or optical signals that include data streams representing various types of signal information, e.g., instructions, messages and data. In embodiments of the invention, the functions of the data interface 1233 may be performed by the communication interface 1214.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Accordingly, embodiments are intended to exemplify alternatives, modifications, and equivalents that may fall within the scope of the claims.

What is claimed is:

1. A computer implemented method for implementing an antecedent, location-based alert to a user through a mobile communication device, the method being performed by a computing apparatus of the mobile communication device and comprising:

the computing apparatus providing an antecedent, location-based alert to a user prior to initiation of one or more transactions between the user and an organization and without knowledge of true intent of the user at least by performing:

the computing apparatus comprising a processor and a positioning device and identifying the organization at least by receiving positioning data that is determined by using at least one or more positioning signals received from one or more positioning satellite systems at the positioning device in the mobile communication device carried by the user and coupled to the one or more positioning satellite systems, by repeatedly receiving the one or more positioning signals and updating the positioning data at the positioning device with the one or more positioning signals, and, after passage of a pre-determined period of time after receiving the positioning data, by identifying the organization from multiple organizations, which correspond to the positioning data, with a data structure and one or more complementary positioning signals that enhance positioning accuracy of the positioning data and are received from a complementary positioning device on the mobile communication device based in part or in whole upon results of repeatedly updating the positioning data, wherein the user is inside of or in proximity of the organization, the data structure correlates a plurality of organizations including the organization with their respective locations, and the positioning data of the mobile communication device correspond to the multiple organizations but are not sufficient to determine the organization from the multiple organizations;

a transaction identification and determination module coupled with the processor in the computing apparatus identifying multiple potential transactions for the organization prior to the initiation of the one or more transactions between the user and the organization and without the knowledge of the true intent of the user, wherein the multiple potential transactions correspond to multiple transaction categories having respective transaction limits for the user and are associated with the organization for the user;

the transaction identification and determination module coupled with the processor in the computing apparatus determining a potential transaction of a first transaction type from the multiple potential transactions of multiple transaction types for the user to conduct at the organization based at least in part upon a current time when the user is inside of or in proximity of the organization, the positioning data, and historical transaction data of the user, wherein the historical transaction data include one or more prior transaction patterns during one or more prior time periods, and different times correspond to different transaction types of the multiple transaction types for the user;

the transaction identification and determination module coupled with the processor in the computing apparatus determining a potential transaction amount for the potential transaction prior to the initiation or completion of the potential transaction, without the knowledge of the true intent of the user at the store;

an antecedent alert module stored at least partially in memory of the computing apparatus coupled to a financial management system hosted on a remote host computing system via a computer network and generating or receiving transaction data associated with a goal of the user for the first transaction type in response to at least the potential transaction that is determined by the computing apparatus from the multiple potential transactions; and the antecedent alert module in the computing apparatus presenting the antecedent, location-based alert and at least some of the transaction data to the user on the mobile communication device, wherein the goal of the user comprises a budget goal for the first transaction type, and the transaction limits comprise at least one budget limit associated with the first transaction type.

2. The computer implemented method of claim 1, at least one of the budget goal and the budget data being stored in a physical memory of the mobile communication device or in one or more data structures of a financial management system on a remote computer server.

3. The computer implemented method of claim 1, the budget data being presented to the user before the user engages in a transaction at the identified merchant store.

4. The computer implemented method of claim 1, the budget data and the budget goal being presented to the user before the user engages in a transaction at the identified merchant store.

5. The computer implemented method of claim 4, the merchant store being selected from the plurality of candidate merchant stores based at least in part upon transaction data showing the user previously purchased an item from the merchant store.

6. The computer implemented method of claim 1, in which the action of the computing apparatus identifying the store comprises:

the computing apparatus identifying or receiving the positioning data of the mobile communication device;

the computing apparatus identifying one or more data structures including various positioning data and corresponding stores;

the computing apparatus determining or identifying one or more candidate stores by using the one or more data structures; and the computing apparatus selecting the store from the one or more candidate stores.

7. The computer implemented method of claim 6, the action for the computing apparatus identifying the store further comprises:

the computing apparatus determining whether the positioning data corresponds to multiple stores;

the computing apparatus identifying the multiple stores as the one or more candidate stores, wherein the positioning data corresponds to the multiple stores such that the positioning data alone is insufficient to uniquely identify the store from the multiple stores;

the computing apparatus determining whether the store corresponds to the multiple potential transactions by using at least the one or more data structures which include stores and their respective types of transactions; and the computing apparatus determining the potential transaction by using at least the one or more data structures.

8. The computer implemented method of claim 7, the action for the computing apparatus determining the potential transaction by using the at least the one or more data structures comprising at least one of:

the computing apparatus determining the potential transaction from the multiple transactions from a user's input for the potential transaction, in which the user's input overrides a result of using at least the one or more data structures;

the computing apparatus determining the potential transaction from the multiple transactions using historical data, in which the historical data comprise data or information about prior transaction history of the user at the store; and the computing apparatus preventing the user from conducting the potential transaction at the store by locking up one or more payment means of the user.

9. The computer implemented method of claim 7, in which the action for the computing apparatus identifying the store further comprising at least one of:

the computing apparatus identifying the store using at least one or more signals of a global positioning system;

the computing apparatus identifying the store using at least one or more signals from a hybrid positioning system;

the computing apparatus identifying the store using at least a Wi-Fi positioning system;

the computing apparatus identifying the store using at least an electronic altimeter;

the computing apparatus identifying the store using at least an electronic compass, in which an output of the electronic compass is used to determine the store;

the computing apparatus identifying the store using at least a user's input for the store;

the computing apparatus identifying the store using at least historical data including a pattern that the user has visited one or more stores; and identifying the store using at least a mobile communication device tracking technique.

10. The computer implemented method of claim 7, the process further comprising:

the computing apparatus identifying historical spending data of one or more prior time periods of the user; and the computing apparatus using the historical spending data to determine at least one of the one or more candidate stores, the store, the multiple transactions, the potential transaction, and the budget data.

11. The computer implemented method of claim 10, the process further comprising:

the computing apparatus identifying current spending data of the user; and the computing apparatus calibrating the historical spending data by using at least the current spending data.

12. The computer implemented method of claim 1, the action of the computing apparatus generating or receiving budget data associated with a budget goal comprising:

the computing apparatus determining whether the store corresponds to multiple spending categories by using at least the one or more data structures, wherein the one or more data structures comprise data or information of stores or transaction and their respective categories;

the computing apparatus identifying or determining one or more candidate categories for the store by using the one or more data structures; and the computing apparatus identifying or determining the potential transaction amount for the store.

13. The computer implemented method of claim 12, in which the one or more categories comprise multiple categories, and the process further comprises:

the computing apparatus identifying a respective budget goal for each of the multiple categories;

the computing apparatus allocating the potential transaction amount among the multiple categories; and the computing apparatus generating or receiving the budget data for each of the multiple categories using the respective budget goal.

14. The computer implemented method of claim 12, the process further comprising:

the computing apparatus determining a potential category for the store.

15. The computer implemented method of claim 14, the action for the computing apparatus allocating the potential transaction amount among the multiple categories comprising at least one of:

the computing apparatus allocating the potential transaction amount to a first category of the multiple categories in its entirety;

the computing apparatus allocating the potential transaction amount to a second category with most remaining budget;

the computing apparatus allocating the potential transaction amount to a third category with a slowest spending pace;

the computing apparatus allocating the potential transaction amount to two or more categories of the multiple categories based at least in part upon historical data, in which the historical data comprise one or more amounts that the user has spent in each of the two or more categories; and the computing apparatus dividing the potential transaction amount among the two or more categories based at least in part upon a respective weight for each of the two or more categories.

16. The computer implemented method of claim 1, the budget data comprises at least one of:
   an amount of the budget goal remaining for a current budgeting period or an amount the user is over the budget goal for the current budgeting period;
   an amount of the budget goal remaining for the current budget period or an amount the user would be over the budget goal for the current budget period if the user completed a transaction at the merchant store;
   remaining time till an end of the current budgeting period;
   an indication that the user is currently under or over the budget goal for a current budget period;
   an amount of time remaining until an end of the current budgeting period;
   a message to the user;
   a message to a super user, a custodian, or a primary account holder;
   an account balance of the user before and after a potential transaction at the store; and
   a lock-up notification to the user.

17. The computer implemented method of claim 16, the transaction being initiated or completed using the mobile communication device.

18. The computer implemented method of claim 1, the process further comprising:
   the computing apparatus initiating or completing one or more transactions at the store;
   the computing apparatus updating a record on the mobile communication device reflecting an amount of the one or more transactions; and
   the computing apparatus synchronizing data or information between the mobile communication device and the computer to update the budget data based at least in part upon a transaction amount for the one or more transactions.

19. The computer implemented method of claim 18, further comprising the computing apparatus updating budget data stored on the computer.

20. A system for implementing an antecedent reminder of a goal of a user through a mobile communication device, the system comprising:
   a computing apparatus that comprises a processor and an positioning device and is configured at least to:
   provide an antecedent, location-based alert to a user prior to initiation of one or more transactions between the user and an organization and without knowledge of true intent of the user at least by performing:
   identify the organization at least by receiving positioning data that is determined by using at least one or more positioning signals received from one or more positioning satellite systems at the positioning device in the positioning device in the mobile communication device carried by the user and coupled to the one or more positioning satellite systems, by repeatedly receiving the one or more positioning signals and updating the positioning data with the one or more positioning signals, and, after passage of a pre-determined period of time after receiving the positioning data, by identifying the organization from multiple organizations that correspond to the positioning data with a data structure and one or more complementary positioning signals that enhance positioning accuracy of the positioning data and are received from a complementary positioning device on the mobile communication device based in part or in whole upon results of repeatedly updating the positioning data, wherein
   the user is inside of or in proximity of the organization, the data structure correlates a plurality of organizations including the organization with their respective locations, and the positioning data of the mobile communication device correspond to the multiple organizations but are not sufficient to determine the organization from the multiple organizations;
   invoke a transaction identification and determination module that is coupled with the processor and identifies multiple potential transactions for the organization prior to the initiation of the one or more transactions between the user and the organization and without the knowledge of the true intent of the user, wherein the multiple potential transactions correspond to multiple transaction categories having respective transaction limits for the user and are associated with the organization for the user;
   invoke the transaction identification and determination module that is coupled to a financial management system hosted on a remote host computing system via a computing network and determines a potential transaction of a first transaction type from the multiple potential transactions of multiple transaction types for the user to conduct at the organization based at least in part upon and a current time when the user is inside of or in proximity of the organization, the positioning data, and historical transaction data of the user, wherein the historical transaction data include one or more prior transaction patterns during one or more prior time periods, and different times correspond to different transaction types of the multiple transaction types for the user;
   invoke the transaction identification and determination module that determines a potential transaction amount for the potential transaction prior to the initiation or completion of the potential transaction, without the knowledge of the true intent of the user at the organization;
   invoke an antecedent alert module that is stored at least partially in memory of the computing apparatus and is coupled to the financial management system and generates or receives transaction data in response to at least the potential transaction that is determined by the computing apparatus from the multiple potential transactions; and
   invoke the antecedent alert module that presents the antecedent, location-based alert and at least some of the transaction data to the user on the mobile communication device, wherein the goal of the user comprises a budget goal for the first transaction type.

21. The system of claim 20, the computing apparatus that is to identify the store is further to:
   identify or receive the positioning data;
   identify one or more data structures including various positioning data and corresponding stores;
   determine or identify one or more candidate stores by using the one or more data structures;
   determine the store from the one or more candidate stores;
   determine whether the positioning data corresponds to multiple stores;
   identify the multiple stores as the one or more candidate stores, wherein the positioning data corresponds to the multiple stores such that the positioning data alone is insufficient to uniquely identify the store from the multiple stores;
determine whether the store correspond to multiple transactions by using at least the one or more data structures which include stores and their respective transactions; and
determine a potential transaction by using at least the one or more data structures.

22. The system of claim 21, in which the computing apparatus is further to:
identify the historical spending data of one or more prior time periods of the user;
use the historical spending data to determine at least one of the one or more candidate stores, the store, the multiple transactions, the potential transaction, and the budget data;
identify current spending data of the user; and
calibrate the historical spending data by using at least the current spending data.

23. The system of claim 21, in which the computing apparatus is further to:
identify the store using at least one or more signals of a global positioning system;
identify the store using at least one or more signals from a hybrid positioning system;
identify the store using at least a Wi-Fi positioning system;
identify the store using at least an electronic altimeter;
identify the store using at least an electronic compass, in which an output of the electronic compass is used to determine the store;
identify the store using at least a user's input for the store;
identify the store using at least historical data including a pattern that the user has visited one or more stores; or
identify the store using at least a mobile communication device tracking technique.

24. The system of claim 20, in which the computing apparatus that is to identify the budget goal for the store is further to:
determine whether the store corresponds to multiple spending categories by using at least the one or more data structures, wherein the one or more data structures comprise data or information of stores or transaction and their respective categories;
identify or determine one or more candidate categories for the store by using the one or more data structures;
determine a potential category for the store; and
identify or determine a potential transaction amount for the store.

25. The system of claim 24, the computing apparatus is further to:
determine a potential category for the store, in which the computing apparatus that is to allocate the potential transaction amount among the multiple categories is further to:
allocate the potential transaction amount to a first category of the multiple categories in its entirety;
allocate the potential transaction amount to a second category with most remaining budget;
allocate the potential transaction amount to a third category with a slowest spending pace;
allocate the potential transaction amount to two or more categories of the multiple categories based at least in part upon historical data, in which the historical data comprise one or more amounts that the user has spent in each of the two or more categories; or
divide the potential transaction amount among the two or more categories based at least in part upon a respective weight for each of the two or more categories.

26. A computer program product comprising a non-transitory computer readable storage medium having stored thereupon a sequence of instructions which, when executed by a mobile communication device, causes the at mobile communication device to perform a set of acts for implementing an antecedent, location-based budget alert to a user through a mobile communication device, the set of acts being performed by a computing apparatus of the mobile communication device and comprising:
the computing apparatus providing an antecedent, location-based alert to a user prior to initiation of one or more transactions between the user and an organization and without knowledge of true intent of the user at least by performing:
the computing apparatus comprising a processor and an positioning device and identifying the organization at least by receiving positioning data that is determined by using at least one or more positioning signals received from one or more positioning satellite systems at the positioning device in the mobile communication device carried by the user and coupled to the one or more positioning satellite systems, by repeatedly receiving the one or more positioning signals and updating the positioning data with the one or more positioning signals, and, after passage of a pre-determined period of time after receiving the positioning data, by identifying the organization from multiple organizations, which correspond to the positioning data, with a data structure and one or more complementary positioning signals that enhance positioning accuracy of the positioning data and are received from a complementary positioning device on the mobile communication device based in part or in whole upon results of repeatedly updating the positioning data, wherein
the user is inside of or in proximity of the organization, the data structure correlates a plurality of organizations including the organization with their respective locations, and the positioning data of the mobile communication device correspond to the multiple organizations but are not sufficient to determine the organization from the multiple organizations;
a transaction identification and determination module coupled with the processor in the computing apparatus identifying multiple potential transactions for the organization prior to the initiation of the one or more transactions between the user and the organization and without the knowledge of the true intent of the user, wherein the multiple potential transactions correspond to multiple transaction categories having respective transaction limits for the user and are associated with the organization for the user;
the transaction identification and determination module coupled to a financial management system hosted on a remote host computing system via a computing network and determining a potential transaction of a first transaction type from the multiple potential transactions of multiple transaction types for the user to conduct at the organization based at least in part upon a current time when the user is inside of or in proximity of the organization, the positioning data, and historical transaction data of the user, wherein the historical transaction data include one or more prior transaction patterns during one or more prior time periods, and different times correspond to different transaction types of the multiple transaction types for the user, the transaction identification and determination module coupled with the processor in the computing apparatus determining a potential transaction amount for the potential transaction prior to initiation or completion of the potential transaction, without knowledge of true intent of the user at the organization;

an antecedent alert module stored at least partially in memory of the computing apparatus coupled to the financial management system and generating or receiving transaction data associated with a goal of the user for the first transaction type in response to at least the potential transaction that is determined by the computing apparatus from the multiple potential transactions, and the antecedent alert module in the computing apparatus presenting the antecedent, location-based alert and at least some of the transaction data to the user on the mobile communication device, wherein the goal of the user comprises a budget goal for the first transaction type, and the transaction limits comprise at least one budget limit associated with the first transaction type.

27. The computer program product of claim 26, the action of identifying the budget goal for the store comprising:

the computing apparatus determining whether the store corresponds to multiple spending categories by using at least the one or more data structures, wherein the one or more data structures comprise data or information of stores or transaction and their respective categories identifying or determining one or more candidate categories for the store by using the one or more data structures, and the computing apparatus determining a potential category for the store, and identifying or determining a potential transaction amount for the store.

28. The computer program product of claim 27, the process further comprising:

the computing apparatus determining a potential category for the store, in which the action for the computing apparatus allocating the potential transaction amount among the multiple categories comprising at least one of:

the computing apparatus allocating the potential transaction amount to a first category of the multiple categories in its entirety, the computing apparatus allocating the potential transaction amount to a second category with most remaining budget, the computing apparatus allocating the potential transaction amount to a third category with a slowest spending pace, the computing apparatus allocating the potential transaction amount to two or more categories of the multiple categories based at least in part upon historical data, in which the historical data comprise one or more amounts that the user has spent in each of the two or more categories, and the computing apparatus dividing the potential transaction amount among the two or more categories based at least in part upon a respective weight for each of the two or more categories.

29. The computer program product of claim 26, the action of the computing apparatus identifying the store comprising:

the computing apparatus identifying or receiving the positioning data, identifying one or more data structures including various positioning data and corresponding stores, the computing apparatus determining or identifying one or more candidate stores by using the one or more data structures, the computing apparatus determining the store from the one or more candidate stores, the computing apparatus determining whether the positioning data corresponds to multiple stores, the computing apparatus identifying the multiple stores as the one or more candidate stores, the computing apparatus determining whether the store correspond to multiple transactions by using at least the one or more data structures which include stores and their respective transactions, and the computing apparatus determining a potential transaction by using at least the one or more data structures.

30. The computer program product of claim 26, the process further comprising:

the computing apparatus identifying historical spending data of one or more prior time periods of the user, the computing apparatus using the historical spending data to determine at least one of the one or more candidate stores, the store, the multiple transactions, the potential transaction, and the budget data, the computing apparatus identifying current spending data of the user, and the computing apparatus calibrating the historical spending data by using at least the current spending data.

31. The computer program product of claim 26, the process further comprising at least one of:

the computing apparatus identifying the store using at least one or more signals of a global positioning system, the computing apparatus identifying the store using at least one or more signals from a hybrid positioning system, the computing apparatus identifying the store using at least a Wi-Fi positioning system, the computing apparatus identifying the store using at least an electronic altimeter, the computing apparatus identifying the store using at least an electronic compass, in which an output of the electronic compass is used to determine the store, the computing apparatus identifying the store using at least a user's input for the store, the computing apparatus identifying the store using at least historical data including a pattern that the user has visited one or more stores, and the computing apparatus identifying the store using at least a mobile communication device tracking technique.

32. The computer implemented method of claim 1, the process further comprising:

the transaction identification and determination mechanism coupled with the processor in the computing apparatus allocating the potential transaction amount for the potential transaction to one or more spending categories of the multiple spending categories prior to the initiation or the completion of the potential transaction, without the knowledge of the true intent of the user at the store.

* * * * *